(12) United States Patent
Akhoury et al.

(10) Patent No.: US 11,544,233 B2
(45) Date of Patent: Jan. 3, 2023

(54) FILE SOURCE TRACKING

(71) Applicant: Citrix Systems, Inc., Fort Lauderdale, FL (US)

(72) Inventors: Arnav Akhoury, Bangalore (IN);
Divyansh Deora, Bangalore (IN);
Satish Vanahalli, Bangalore (IN);
Nandikotkur Achyuth, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 288 days.

(21) Appl. No.: 16/987,696

(22) Filed: Aug. 7, 2020

(65) Prior Publication Data

US 2021/0406225 A1 Dec. 30, 2021

(30) Foreign Application Priority Data

Jun. 24, 2020 (IN) .............................. 202041026752

(51) Int. Cl.
| | |
|---|---|
| *G06F 16/18* | (2019.01) |
| *H04L 9/40* | (2022.01) |
| *H04L 9/32* | (2006.01) |
| *G06F 16/17* | (2019.01) |

(52) U.S. Cl.
CPC ...... *G06F 16/1873* (2019.01); *G06F 16/1734* (2019.01); *H04L 9/3247* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 6,766,334 B1 * | 7/2004 | Kaler | .................. | G06F 8/71 |
| | | | | 707/999.203 |
| 8,474,038 B1 * | 6/2013 | Wong | .................. | G06F 21/565 |
| | | | | 726/22 |
| 8,655,844 B1 * | 2/2014 | Wong | .................. | G06F 21/565 |
| | | | | 707/638 |
| 8,701,193 B1 * | 4/2014 | Wong | .................. | G06F 21/564 |
| | | | | 713/192 |
| 8,984,502 B2 * | 3/2015 | Culter | .................. | G06F 8/65 |
| | | | | 717/171 |
| 10,783,326 B2 * | 9/2020 | Glover | .................. | G06F 40/194 |
| 10,911,304 B1 * | 2/2021 | Xu | .................. | H04L 61/5014 |

FOREIGN PATENT DOCUMENTS

| | | | | | |
|---|---|---|---|---|---|
| EP | 0952521 | * | 4/1999 | ............. | G06F 11/30 |
| FR | 2773242 A1 | * | 7/1999 | ............. | G06F 8/71 |
| KR | 101435341 B1 | * | 8/2014 | | |

* cited by examiner

*Primary Examiner* — Uyen T Le
(74) *Attorney, Agent, or Firm* — Pierce Atwood LLP

(57) ABSTRACT

A computing system may determine different patterns of modifications that are to be made to data of a file to generate respective modified versions of the file, the different patterns of modifications enabling identification of other files derived from the respective modified versions of the file, the different patterns of modifications including a first pattern of modifications. The computing system may generate a first modified version of the file at least in part by modifying the data based on the first pattern of modifications, may send the first modified version of the file to a client device, and may store signature data indicative the first pattern of modifications so as to enable identification of other files derived from the first modified version of the file.

20 Claims, 12 Drawing Sheets

FILE SOURCE TRACKING

CROSS-REFERENCE TO RELATED APPLICATIONS

This application claims priority under 35 U.S.C. § 119(a) to Provisional Application No. 202041026752, entitled FILE SOURCE TRACKING, which was filed with the Indian Patent Office on Jun. 24, 2020, the entire contents of which are incorporated herein by reference for all purposes.

BACKGROUND

Various file sharing systems have been developed that allow users to share files or other data. ShareFile®, offered by Citrix Systems, Inc., of Fort Lauderdale, Fla., is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method performed by computing system involves determining different patterns of modifications that are to be made to first data of a file to generate respective modified versions of the file, the different patterns of modifications enabling identification of other files derived from the respective modified versions of the file, the different patterns of modifications including a first pattern of modifications. The computing system generates a first modified version of the file at least in part by modifying the first data based on the first pattern of modifications, sends the first modified version of the file to a first client device, and stores first signature data indicative the first pattern of modifications so as to enable identification of other files derived from the first modified version of the file.

In some disclosed embodiments, a method performed by a computing system involves identifying a copy of a file and accessing stored signature data entries for respective modified versions of the file, wherein the stored signature data entries are indicative of different patterns of modifications made to first data of the file to generate the respective modified versions of the file, the different patterns of modifications include a first pattern of modifications made to the first data of the file to generate a first modified version of the file, and the stored signature data entries include a first signature data entry for the first modified version of the file. The computing system determines that second data of the copy of the file is at least partially consistent with the first pattern of modifications indicated by the first signature data entry, and determines, based at least in part on the second data being at least partially consistent with the first pattern of modifications, that the copy of the file was derived from the first modified version of the file.

In some disclosed embodiments, a computing system comprise at least one processor, and at least one computer-readable medium encoded with instruction which, when executed by the at least one processor, cause the computing system to determine different patterns of modifications that are to be made to first data of a file to generate respective modified versions of the file, the different patterns of modifications enabling identification of other files derived from the respective modified versions of the file, the different patterns of modifications including a first pattern of modifications, to generate a first modified version of the file at least in part by modifying the first data based on the first pattern of modifications, to send the first modified version of the file to a first client device, and to store first signature data indicative the first pattern of modifications so as to enable identification of other files derived from the first modified version of the file.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
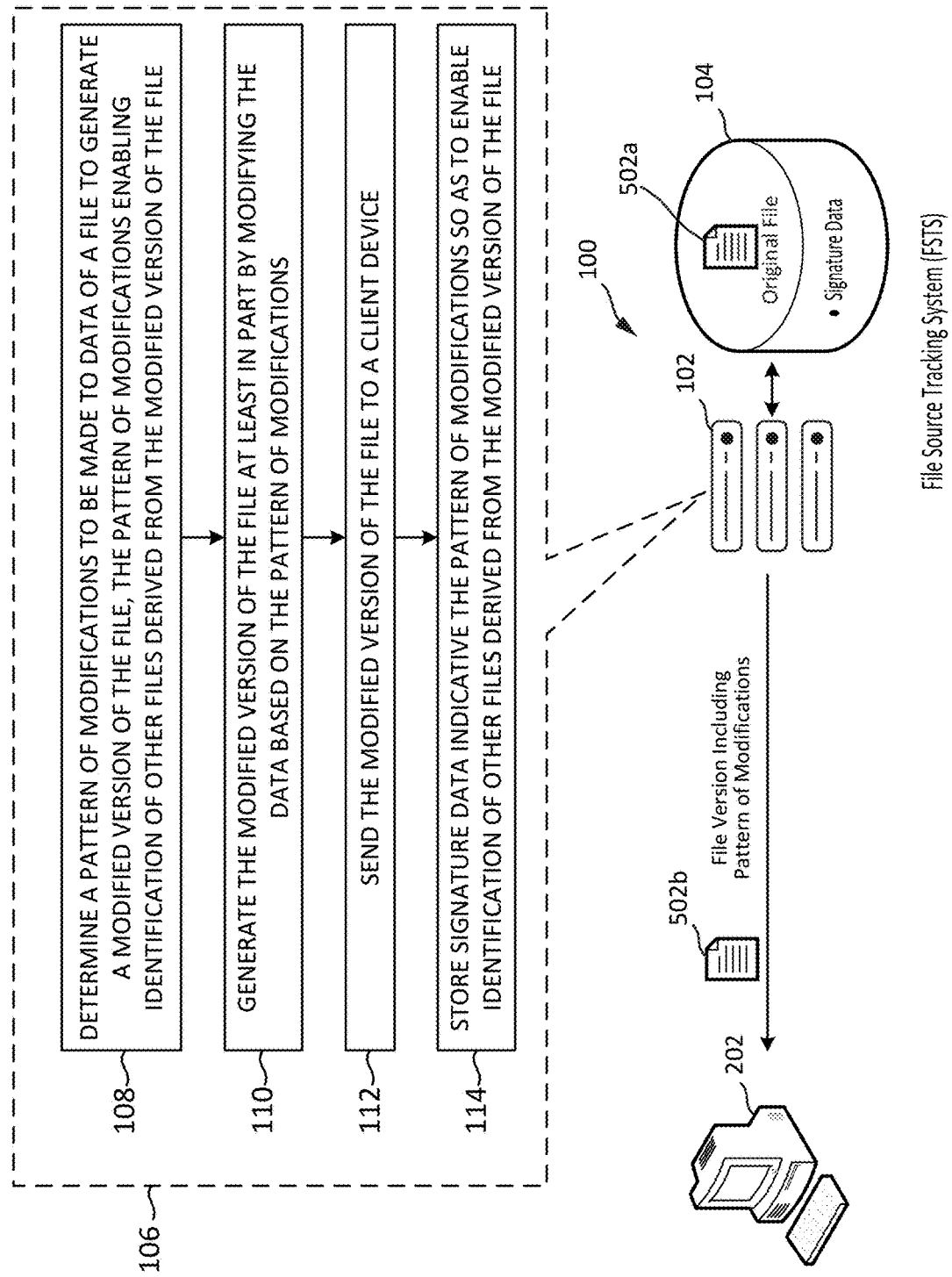
FIG. 1A shows a first example implementation of a file source tracking system configured in accordance with the present disclosure.

For purposes of reading the description of the various embodiments below, the following descriptions of the sections of the specification and their respective contents may be helpful:

Section A provides an introduction to example embodiments of a file source tracking system;

Section B describes a network environment which may be useful for practicing embodiments described herein;

Section D describes a computing system which may be useful for practicing embodiments described herein.

Section E describes embodiments of systems and methods for delivering shared resources using a cloud computing environment;

Section F describes example embodiments of systems for providing file sharing over networks;

Section G provides a more detailed description of example embodiments of the file source tracking system introduced above in Section A;

Section H describes example implementations of methods, systems/devices, and computer-readable media in accordance with the present disclosure.

A. Introduction to Illustrative Embodiments of a File Source Tracking System

Various file sharing systems have developed that allow users to share files with other users over a network. An example of such a file sharing system 504 is described below (in Section F) in connection with FIGS. 5A-C. As explained in Section F, in some implementations, one client device 202 may upload a copy of a file 502 (shown in FIG. 5A) to a central repository of the file sharing system 504, such as the storage system 508 shown in FIGS. 5A-C, and another client device 202 may then download a copy of that same file 502 from that same repository. As Section F also describes, in some implementations, an access management system 506 may regulate the circumstances in which files 502 may be uploaded and/or downloaded to/from the storage system 508 by various client devices 202.

Files are sometimes shared with other users with the expectation that the recipient users will not further disseminate the files to others. For example, certain design documents, scripts of movies, product specifications and/or designs, etc., may be considered confidential and/or sensitive, and files for such documents may be shared with an understanding (either express or implied) that such documents will not be shared with others. Some recipients of such confidential/sensitive files might, either intentionally or inadvertently, share such files with others, in spite of an obligation to keep them in confidence. Steps are thus sometimes taken to inhibit such unauthorized redistribution of files.

One existing technique for inhibiting the redistribution of confidential/sensitive files is to physically transport a hard copy of the to-be-shared file or a computing device that allows "view only" access to the file to an intended recipient, and taking steps to track the chain of custody of that hard copy/device to make sure it does not fall into the wrong hands. Another existing technique for inhibiting the redistribution of confidential/sensitive files is to encrypt an electronic copy of a file so that the file can be accessed only using specific software that is capable of decrypting the file, and then restricting access to the specific decryption software to particular individuals.

The inventors have recognized and appreciated that such existing techniques for inhibiting further distribution of confidential/sensitive files can be cumbersome and/or not sufficiently effective in at least some circumstances. The extra steps needed to implement such techniques can be burdensome and time consuming for both the individuals sharing the files and for the intended recipients, thus resulting in a poor user experience. Further, when such techniques are somehow compromised such that a copy of a restricted file gets "leaked," there is currently no effective way of tracing unauthorized copies of the file back to the individual who allowed it to fall into the wrong hands.

Offered are systems and techniques for making different patterns of modifications to data represented in a file before sharing respective copies of the file with others. Recognizing that some files may include data that is an encoded (e.g., compressed) version of other data, as used herein, the phrases "data included in a file," "data in a file," "data of a file," or the like, when referring to files including encoded data, are meant to encompass the encoded data within the file as well as any data (e.g., raw, un-encoded data) that is represented by such encoded data. Because the patterns of data modifications are different for the respective shared copies, other files that are copies of, or are otherwise derived from, such initially shared copies can be readily traced back to the original recipients of those copies. In some implementations, the different patterns of data modifications may be made in such a way that they do not alter the substantive content of the files, such as text, image frames, audio samples, etc., in a manner that can be readily detected and/or perceived by an end user. Further, in some implementations, the different patterns of data modifications may be made in such a way that it would be extremely difficult, if not impossible, for a recipient of such a file to identify and/or reverse the modifications that were made.

In some implementations, the nature of the different patterns of data modifications and/or the manner in which they are made within initially shared files may depend on the types of files that are being shared. For example, for a video file, the payload can be extracted from a container and decoded so as to provide access to the raw bits representing pixels within respective video frames. That raw payload data may then be modified in a particular way, such as by altering and/or inserting one or more bits at one or more selected addresses. In some implementations, metadata in the file (in the payload or otherwise) may additionally or alternatively be altered or added in such a way that the manner in which the substantive payload of the file, e.g., text, video frames, audio samples, etc., is interpreted and/or presented as output is not impacted in a detectable fashion.

In some implementations, the one or more addresses at which one or more bits are altered and/or inserted may be randomly determined or otherwise variably selected from among a set of possible addresses. In some implementations, such possible addresses may correspond to portions of media represented by the file at which alterations are less likely to be detected and/or observed by a user, such as the outer edges of an image frame. In some implementations, such possible addresses may additionally or alternatively be selected within portion(s) of the file that store insignificant metadata, such as time stamps or the like that do not alter the manner in which the substantive payload of the file is to be interpreted and/or presented as output.

In some implementations, the manner in which one or bits are altered at selected addresses may also be variable and/or randomly determined. For example, in some implementations, bitmasks may be randomly generated or otherwise variably selected for respective addresses and such bitmasks may be applied, e.g., using an exclusive or (XOR) operation, so as to invert one or more bits at the corresponding addresses from a "1" to a "0," or vice versa. In some implementations, such bitmasks may be generated so as to include at least one "1," thus ensuring that a value of at least one bit at the selected address will be changed. In some implementations, such bitmasks be generated so as to include only "0's" for the one or more of the most significant bits, thus ensuring that only one or more of the least significant bits may be selected for inversion. In other implementations, the same bitmask may be applied to the data at some or all of the selected addresses, so as to alter one or more bits, or perhaps all of the bits, at those locations. For example, in some implementation, one or more of the least significant bits at the selected locations may be inverted, such as by applying the bitmask "00000011" or "00000001" to invert only a particular number of least significant bits. In other implementations, the bit values at the selected locations may simply be replaced with randomly generated or otherwise variably selected bit strings at the selected location, although such an approach may be less effective as it leaves open the possibility that the randomly selected or otherwise variably determined bit string will be identical to the bit string that is already at the selected address.

Further, in some implementations, the values of one or more newly inserted bits may additionally or alternatively be randomly or otherwise variably determined, such as by randomly generating one or more bytes of data, or by increasing the binary value of to-be-inserted bytes of data by one for each new data insertion operation.

After the pattern of data modifications has been determined, "signature" data may be stored that is indicative of those modifications. In some implementations, for example, such signature data may represent addresses of one or more addressable chunks of data (e.g., 8-bit blocks of data) at which particular bit patterns were or will be included in a copy of the file, either as modifications to existing bit patterns at such addresses or as newly-inserted bit patterns at such addresses. In any such case, the stored data may subsequently be used to enable the identification of the same modification pattern, or at least some portions of it, within other files that are suspected to have been derived from the initially distributed file copy. Accordingly, if a copy of a confidential/sensitive file including such a pattern of data modifications is further disseminated to other users, the identity of the individual to whom such file was initially shared can be readily identified (by determining that the further disseminated copy includes data that is consistent with some or all of the pattern of modifications that were made to the initially shared file), and appropriate remedial action can be taken to hold that individual accountable and/or to prevent further distribution of the file by that individual.

Figure 1B:
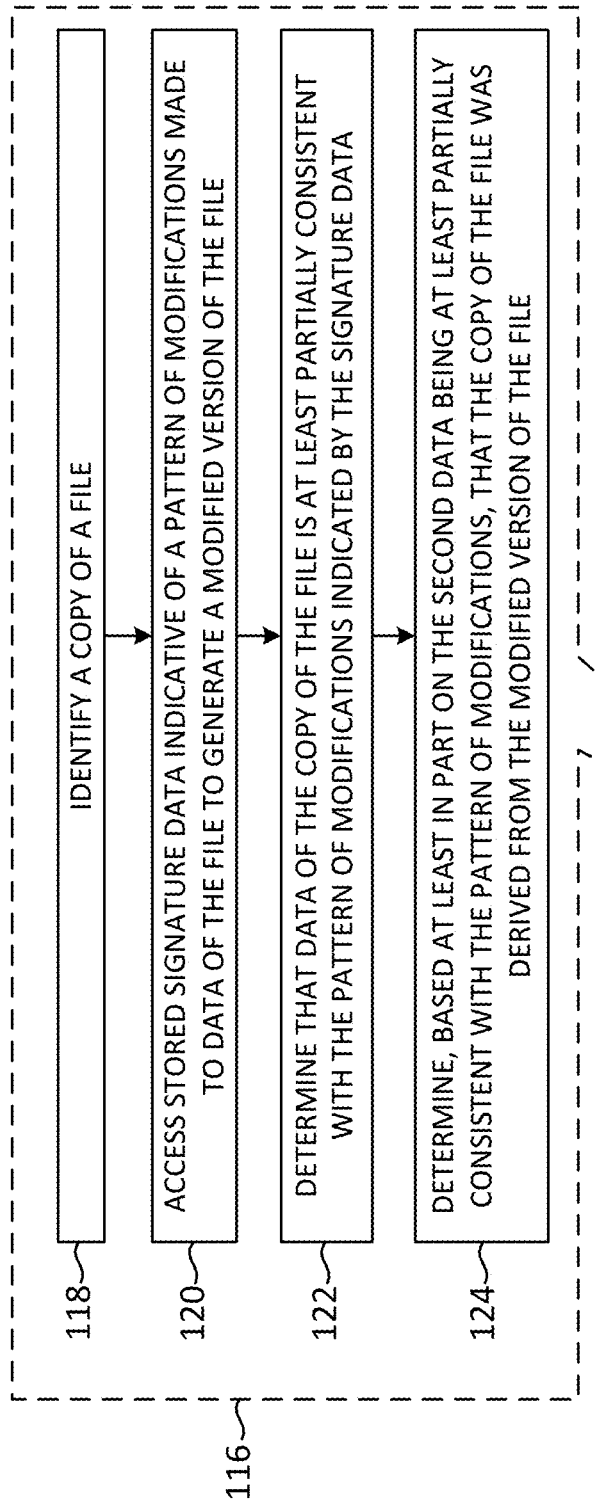
FIG. 1B shows a second example implementation of a file source tracking system configured in accordance with the present disclosure.
Figure 1B:
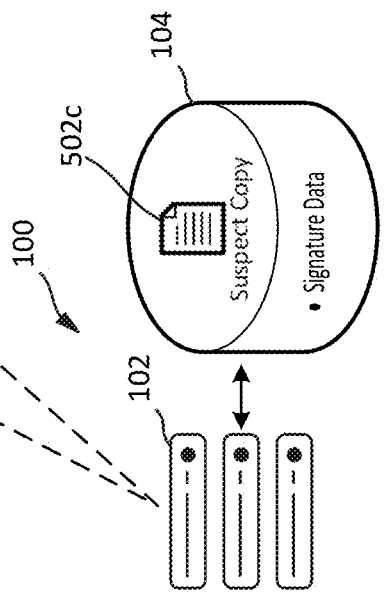

FIGS. 1A and 1B show a high-level implementation of a file source tracking system 100 configured in accordance with some embodiments of the present disclosure. As shown, the file source tracking system 100 may include one or more servers 102, as well as one or more storage medium(s) 104 in which files 502 that are available for sharing with one or more client devices 202 may be stored.

As shown in FIG. 1A, in some implementations, the server(s) 102 of the file source tracking system 100 may be configured to perform a routine 106 pursuant to which a modified version of a file including a particular pattern of modifications may be generated, and signature data indicative of that pattern of modifications may be stored for file tracking purposes.

At a step 108 of the routine 106, the file source tracking system 100 may determine a particular pattern of modifications that is to be made to data of the original file 502*a*, e.g., data determined by decoding a payload of the original file 502*a*, to generate a modified version of the file 502*b*. The determined pattern of modifications may be different than the patterns of modifications that are made to the data to generate other modified version of the file, thus enabling identification of files that are derived from the modified version of the file being generated.

At a step 110 of the routine 106, the file source tracking system 100 may generate the modified version of the file 502*b* at least in part by modifying the data of the file based on the determined pattern of modifications, e.g., by changing or supplementing the data to include one or more signature bits.

At a step 112 of the routine 106, the file source tracking system 100 may send the modified version of the file 502*b*, including the determined pattern of modifications, to the client device 202.

At a step 114 of the routine 106, the file source tracking system 100 may store signature data, e.g., in the storage medium(s) 104, indicative of the pattern of modifications made the first data, thus enabling identification of other files derived from the first modified version of the file.

As shown in FIG. 1B, in some implementations, the server(s) 102 of the file source tracking system 100 may additionally or alternatively be configured to perform a routine 116.

At a step 118 of the routine 116, the file source tracking system 100 may receive or otherwise identify a suspect copy 502*c* of a file that was potentially derived from a modified version of the file (e.g., the modified version 502*b* shown in FIG. 1A), where such a modified version 502*b* of the file was generated at least in part by modifying data in the original file 502*a*, e.g., data determined by decoding a payload of the original file 502*a*, based on a particular pattern of modifications.

At a step 120 of the routine 116, the file source tracking system 100 may access stored signature data that is indicative of the pattern of modifications that were made to the data of the original file 502*a* to generate the modified version of the file (e.g., the modified version 502*b* shown in FIG. 1A).

At a step 122 of the routine 116, the file source tracking system 100 may determine that data in the suspect copy of the file 502*c*, e.g., data determined by decoding a payload of the copy 502*c*, is at least partially consistent with the pattern of modifications indicated by the stored signature data, e.g., by determining that the data of the suspect copy 502*c* includes one or more of the signature bits the data of the original file 502*a* was modified to include (e.g., per the step 110 of the routine 106 shown in FIG. 1A).

At a step 124 of the routine 116, the file source tracking system 100 may determine, based at least in part on the data of the suspect copy 502*c* being at least partially consistent with the pattern of modifications indicated by the stored signature data, that the suspect copy 502*c* of the file was derived from the modified version of the file 502*b*.

Additional details and example implementations of embodiments of the present disclosure are set forth below in Section G, following a description of example systems and network environments in which such embodiments may be deployed.

B. Network Environment

Figure 2:
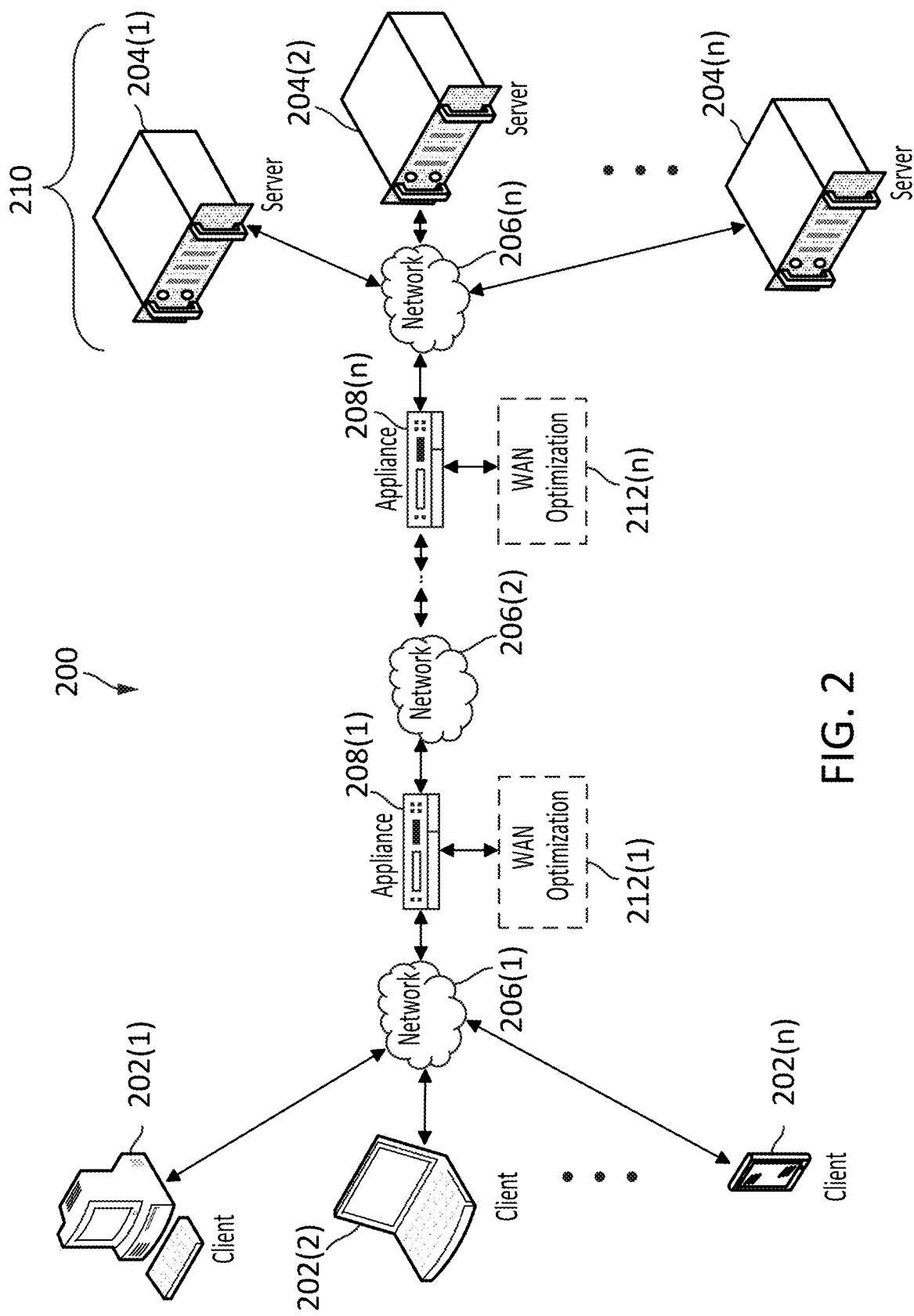
FIG. 2 is a diagram of a network environment in which some embodiments of the file source tracking system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of + an organization.

C. Computing Environment

Figure 3:
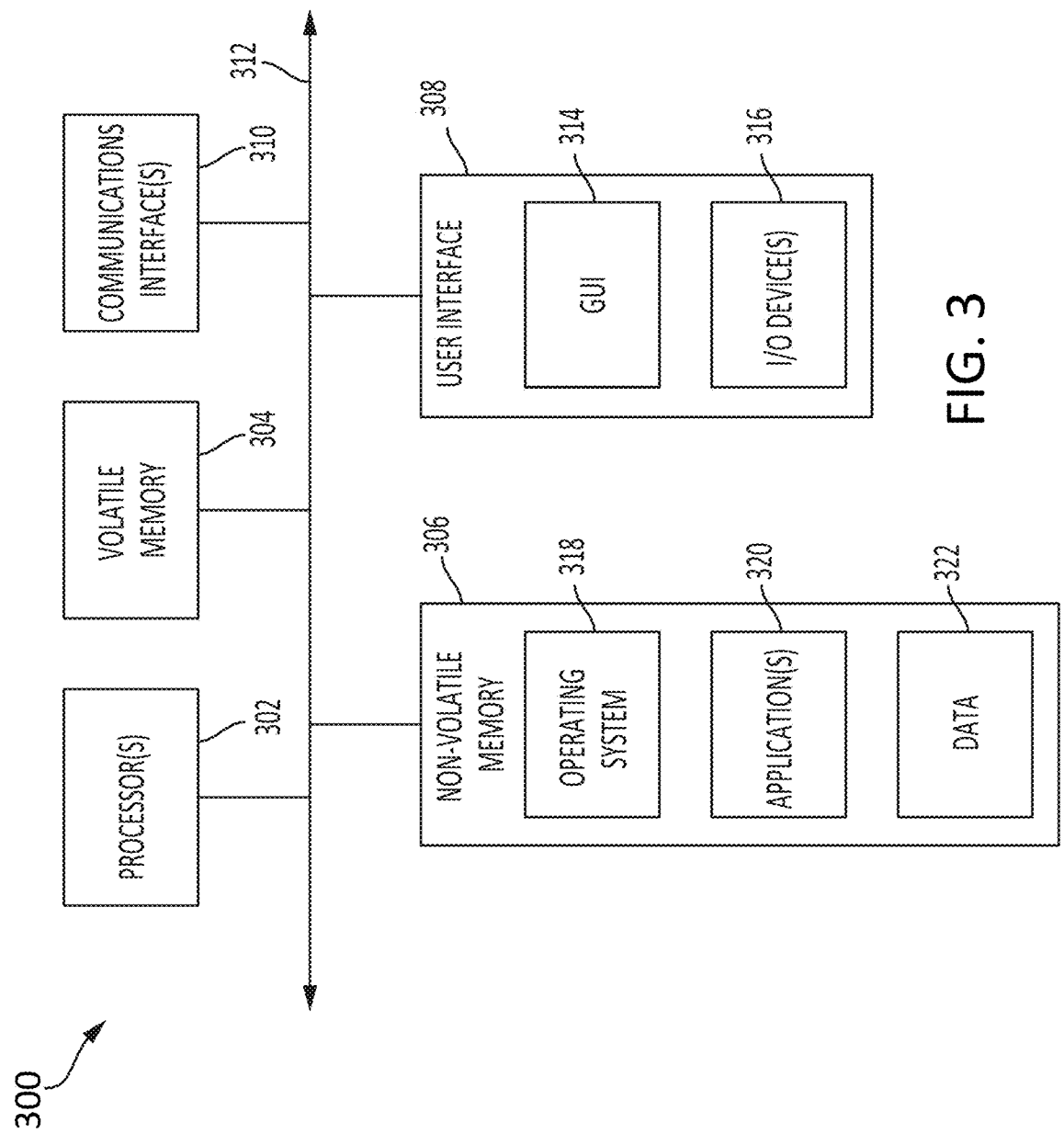
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
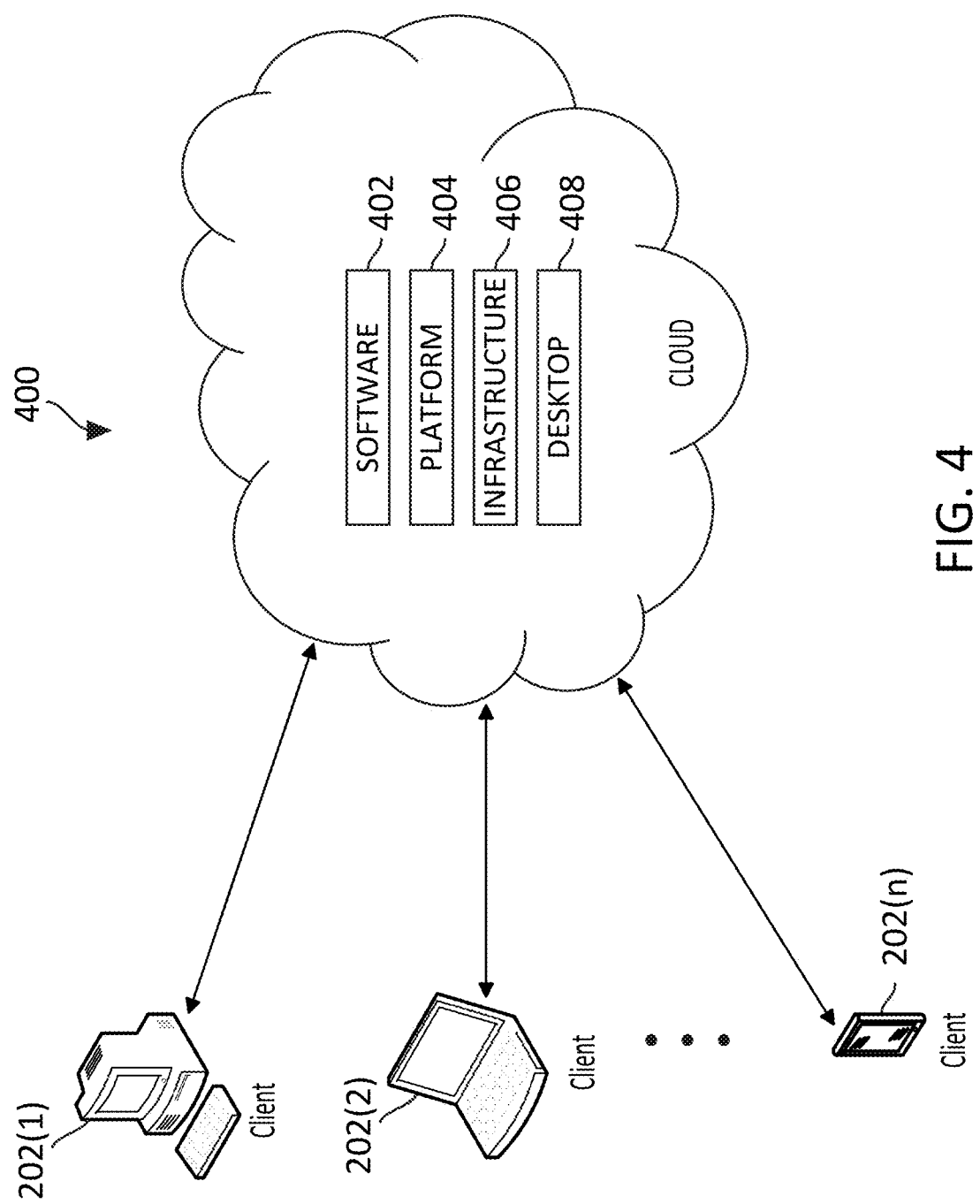
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif. Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

Figure 5A:
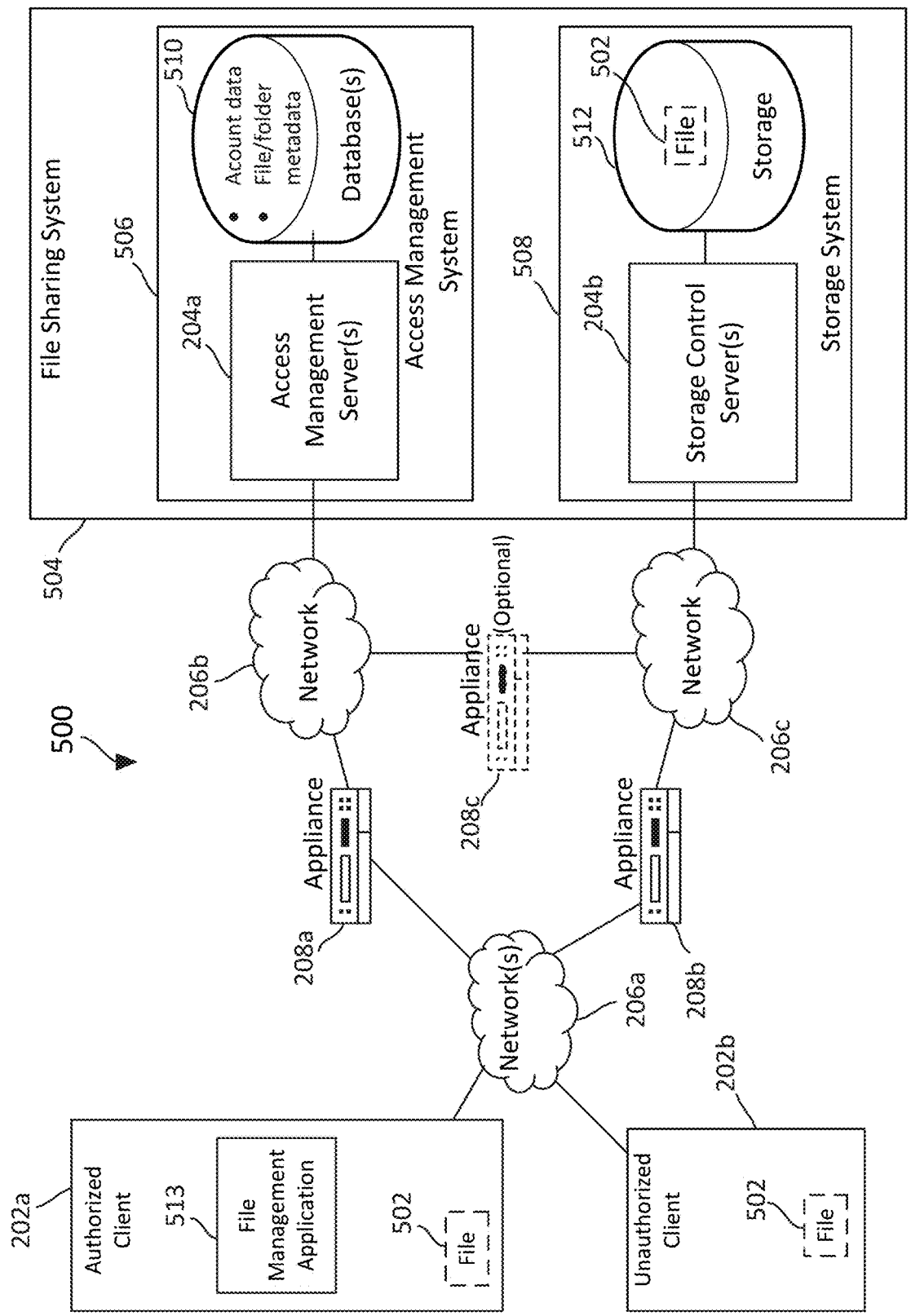
FIG. 5A is a diagram illustrating how a network computing environment like that shown in FIG. 2 may be configured to allow clients access to an example embodiment of a server-based file sharing system.

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one or more files 502 via the file sharing system 504. The file management application 513 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, Fla., are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database 510, and the storage system 508 may include one or more storage control servers 204b and a storage medium 512. In some embodiments, the access management server(s) 204a may, for example, allow a user of the file management application 513 to log in to his or her account, e.g., by entering a user name and password corresponding to account data stored in the database 510. Once the user of the client 202a has logged in, the access management server 204a may enable the user to view (via the authorized client 202a) information identifying various folders represented in the storage medium 512, which is managed by the storage control server(s) 204b, as well as any files 502 contained within such folders. File/folder metadata stored in the database 510 may be used to identify the files 502 and folders in the storage medium 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium 512 may be hosted by a cloud-based service provider (e.g., Amazon Web Services™ or Microsoft Azure™). In other embodiments, the storage control server(s) 204b and/or the storage medium 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 202b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 300 shown in FIG. 3.

Figure 5B:
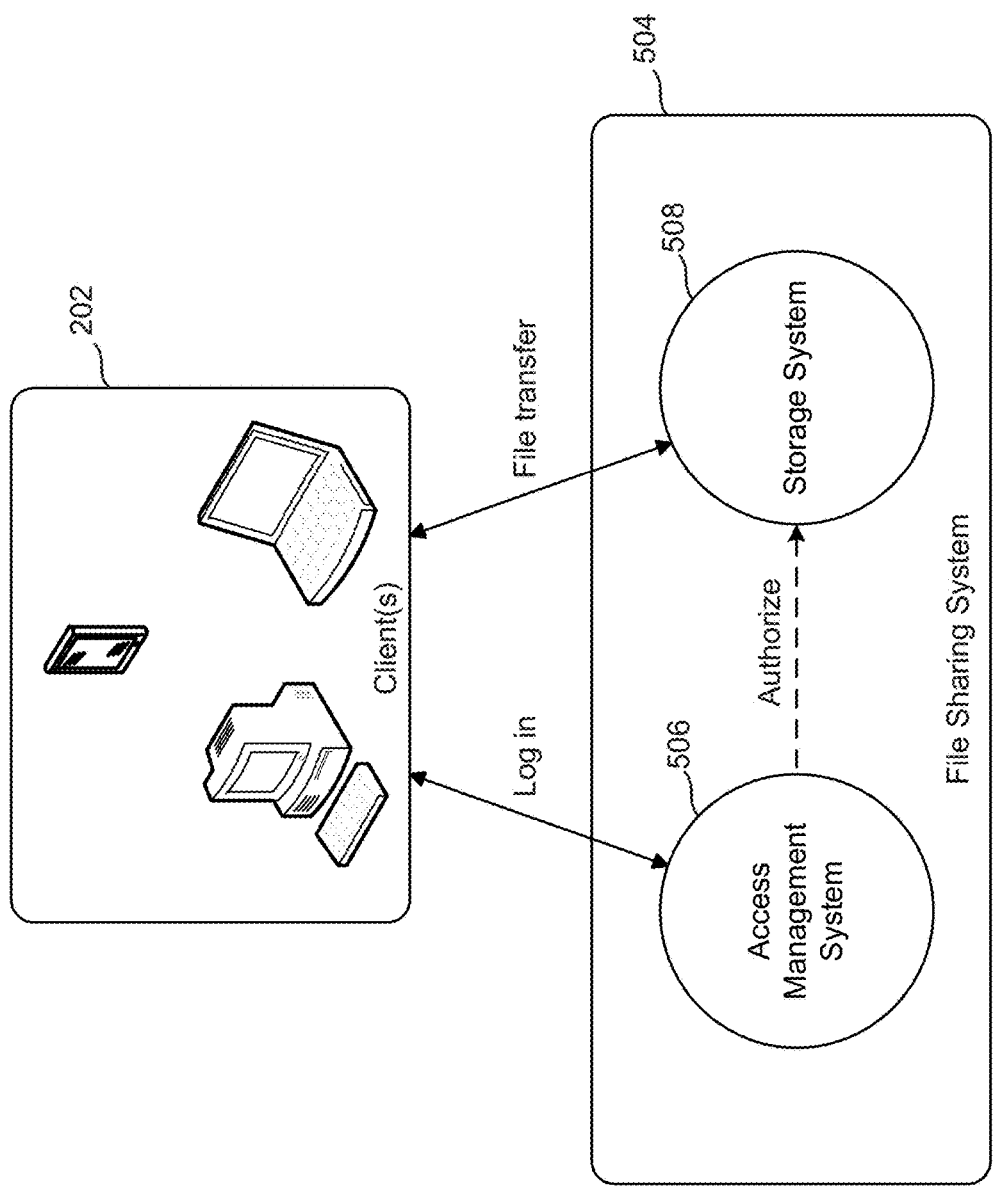
FIG. 5B is a diagram illustrating certain operations that may be performed by the file sharing system shown in FIG. 5A in accordance with some embodiments.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

Figure 5C:
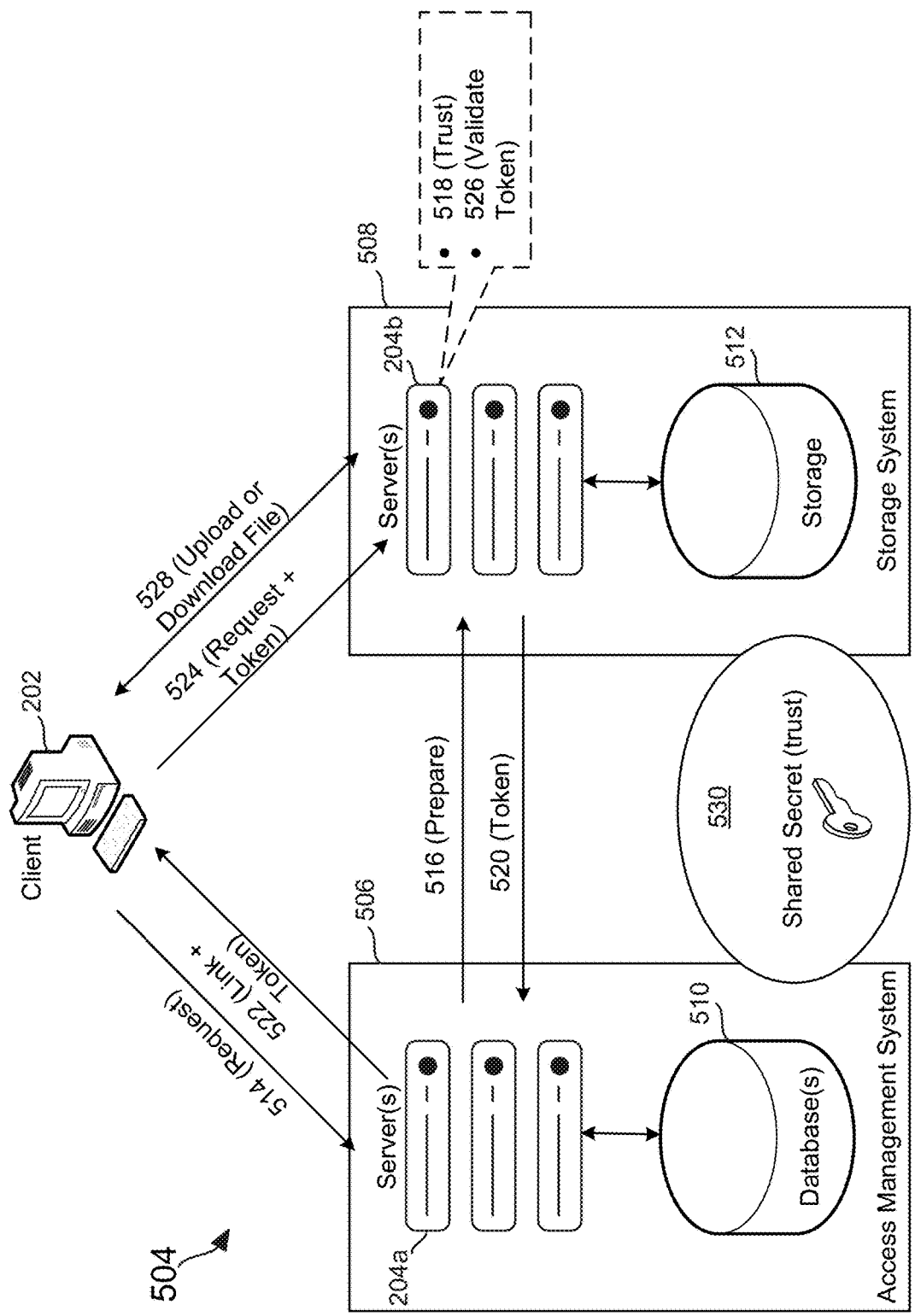
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204b. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those as discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of File Source Tracking System

Figure 6:
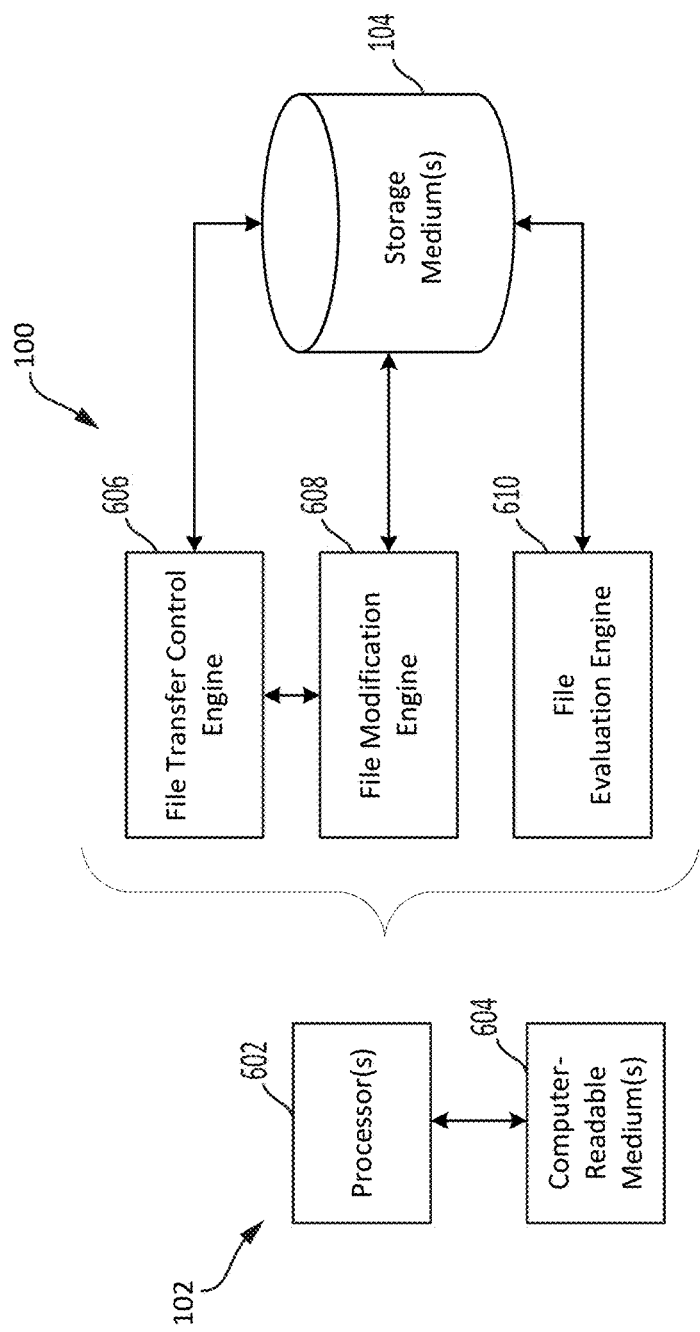
FIG. 6 shows example components that may be included in the file source tracking system shown in FIGS. 1A and 1B.

FIG. 6 shows example components that may be included within the file source tracking system 100 that was introduced above (in Section A) in connection with FIGS. 1A and 1B in accordance with some embodiments. As shown in FIG. 6, in addition to the storage medium(s) 104 (also shown in FIGS. 1A and 1B), the file source tracking system 100 may include one or more processors 602 and one or more computer readable mediums 604 that may be encoded with instructions that can be executed by the processor(s) 602 to cause one or more servers 102 (e.g., as shown in FIGS. 1A and 1B) or other computing system to perform various routines. In the illustrated example, the processor(s) 602 and computer-readable medium(s) 604 embody three functional modules, including a file transfer control engine 606, a file modification engine 608, and a file evaluation engine 610. The engines 606, 608, 610 may be implemented in any of numerous ways and may be disposed at any of a number of locations within a computing network, such the network environment 200 described above (in Section B) in connection with FIG. 2. In some implementations, for example, the processor(s) 602 and the computer-readable medium(s) 604 embodying one or more such components may be located within one or more of the servers 204 and/or the computing system 300 that are described above (in Sections B and C) in connection with FIGS. 2 and 3, and/or may be located within a cloud computing environment 400 such as that described above (in Section D) in connection with FIG. 4.

In some implementations, the file transfer control engine 606 shown in FIG. 6 may correspond to, or operate in conjunction with, the storage control server(s) 204b of the file sharing system 504 described above (in Section E) in connection with FIGS. 5A-C. Further, in some implementations, the storage medium(s) 104 shown in FIGS. 1A-B and 6 may correspond, in whole or in part, to the storage medium(s) 512 of the storage system 508 described in Section E. As Section E explains, in some implementations, the storage control server(s) 204b of the storage system 508 may cause copies of files 502 to be transferred between client devices 202 and the storage medium(s) 512. In particular, in some implementations, as described in connection with FIG. 5C, the access management system 506 may supply upload tokens to the client devices 202 that may be used to identify the particular folders in the storage medium(s) 512 that new files 502 the storage control server(s) 204b receive from the client devices 202 are to be uploaded and/or may supply download tokens to the client devices 202 that may be used to identify the particular files 502 that the storage control server(s) 204b are to download to the client devices 202.

As explained below, in some implementations, the file transfer control engine 606 (shown in FIG. 6) may, in at least some circumstances, rely upon the file modification engine 608 to make a pattern of modifications to a copy of a requested file (to generate a modified version of that file) for tracking purposes, so as to enable the file transfer control engine 606 to send the modified version of the file to the requesting client device 202. In some implementations, the file transfer control engine 606 may request the services of the file modification engine 608 for particular types of files 502, for files 502 that have been assigned a particular designation (e.g., "distribution controlled"), and/or in particular circumstances, such as when a "file tracking" option is selected by the individual who is authorizing that the file 502 be transferred to the client device 202. An example routine 700 that may be performed by the file transfer control engine 606 in accordance with some embodiments of the present disclosure is described below in connection with FIG. 7.

As noted above, at a high level, the file modification engine 608 (shown in FIG. 6) may, in some implementations, be called by the file transfer control engine 606 in at least some circumstances when the file transfer control engine 606 is to provide a copy of a file 502 to a client device 202. In particular, in some implementations, rather than retrieving a copy of a file 502 directly from the storage medium(s) 104, 512 (e.g., in response to receiving a download token from a client device 202), the file transfer control engine 606 may instead rely upon the file modification engine 608 to perform such a file retrieval function, in addition to modifying the retrieved file 502 for tracking purposes, as described herein. In other implementations, the file transfer control engine 606 may instead itself retrieve a file 502 from the storage medium(s) 104 and then request the services of the file modification engine 608 to modify the retrieved file for tracking purposes. An example routine 800 that may be implemented by the file modification engine 608 in the former scenario, i.e., when the file transfer control engine 606 relies upon the file modification engine 608 to retrieve copies of requested files from the storage medium(s) 104, 512, is described below in connection with FIG. 8. As noted above, the file modification engine 608 may store signature data (e.g., in the storage medium(s) 104, 512) that is indicative of the different patterns of modifications that it makes to respective distributed copies of a file 502. Examples of a table 900 that may be used to store such signature data in accordance with some embodiments of the present disclosure is described below in connection with FIG. 9.

At a high level, the file evaluation engine 610 may analyze a copy of a file 502 to determine whether it includes data that is consistent with the pattern of modifications that were made (by the file modification engine 608) to another copy of the file before that other copy was transferred (e.g., by the file transfer control engine 606) to another client device 202. As explained below, in some implementations, such a determination may be made based at least in part on the signature data that the file modification engine 608 stores (e.g., in the table 900) when modified versions of the file 502 are distributed to respective client devices 202. When at least some (e.g., more than a threshold amount), or all, of the stored signature data for a particular modified version of the file 502 is found in the copy of the file 502 being evaluated, the file evaluation engine 610 may determine the copy of the file 502 was derived from that modified version. An example routine 1000 that may be performed by the file evaluation engine 610 in accordance with some embodiments of the present disclosure is described below in connection with FIG. 10.

Figure 7:
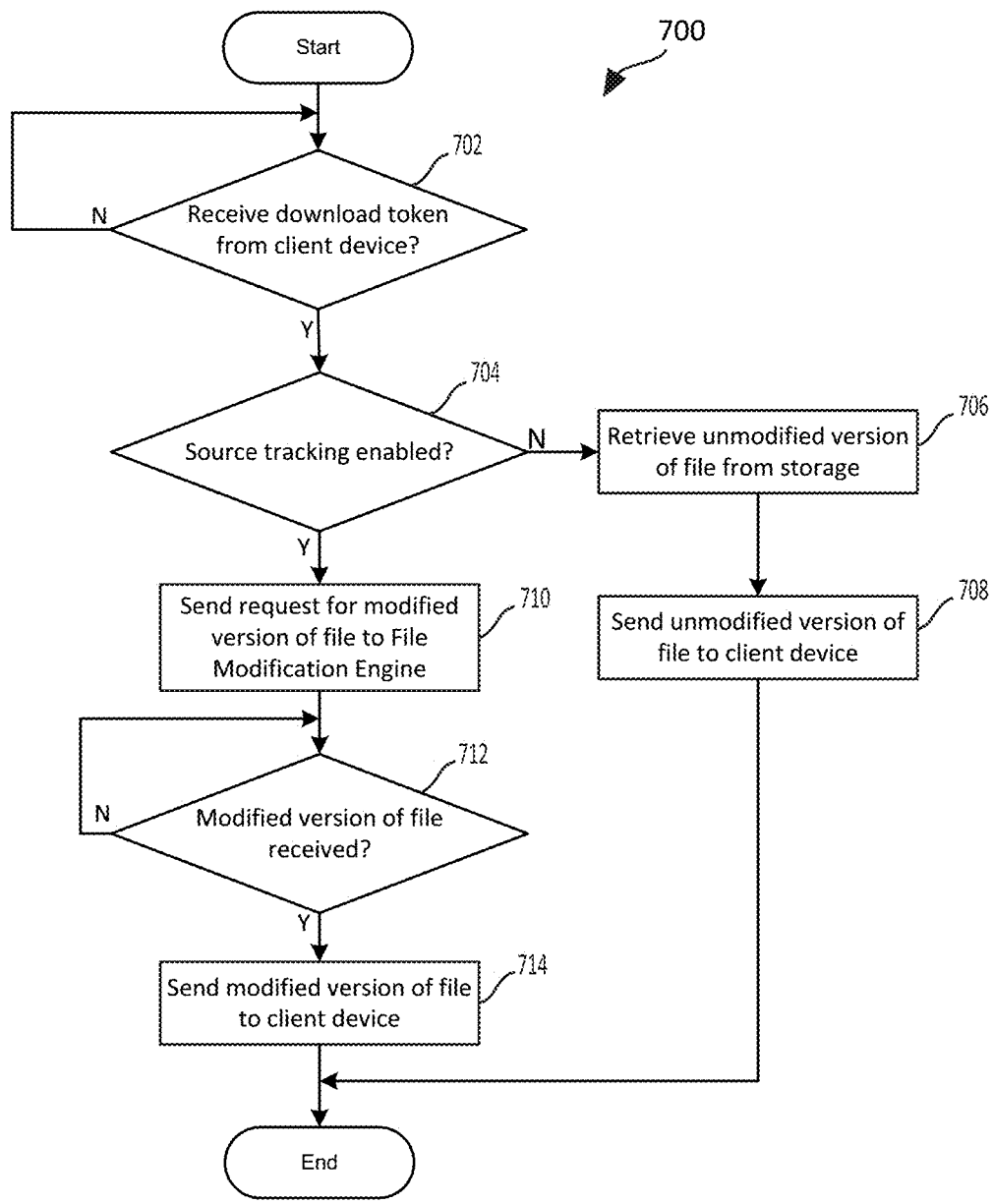
FIG. 7 shows an example routine that may be performed by the file transfer control engine shown in FIG. 6.

FIG. 7 is a flowchart showing an example routine 700 that may be performed by the file transfer control engine 606 shown in FIG. 6. As noted above, in some implementations, the file transfer control engine 606 may correspond to, or operate in conjunction with, the storage control server(s) 204b of the file sharing system 504 described above (in Section E) in connection with FIGS. 5A-C. As shown in FIG. 7, the routine 700 may begin at a decision step 702, at which the file transfer control engine 606 may determine whether it has received a download token from a client device 202. As noted above, in some implementations, the access management server(s) 204a of the file sharing system 504 (shown in FIGS. 5A-C) may send a download token to a client device 202, and the client device may then send that download token to the storage control server(s) 204b to trigger the transfer of a copy of a file 502 identified by the token from the storage medium(s) 512 to the client device 202.

When, at the decision step 702, the file transfer control engine 606 determines that a download token has been received from a client device 202, the routine 700 may proceed to a decision step 704, at which the file transfer control engine 606 may determine whether "source tracking" functionality has been enabled for the requested file 502. In some implementations, for example, a user may elect whether to enable source tracking for a file 502 when the user requests that the file 502 be shared and/or when the user first uploads the file to the file sharing system 504. In other implementations, source tracking may be enabled by default for files that are shared outside an organization, or perhaps for all files. In some implementations, the determination at the decision step 704 may depend on the type of file 502 that is to be shared and/or may depend on whether there is metadata included in and/or associated with the file 502 that indicates the file 502 is confidential, sensitive, etc.

When, at the decision step 704, the file transfer control engine 606 determines that source tracking is not to be performed, the routine 700 may proceed to a step 706, at which the requested file 502 may be retrieved from the storage medium(s) 104, 512, and then to a step 708, at which the retrieved file 502 may be sent to the requesting client device 202 without first having been modified for source tracking purposes. When, on the other hand, the file transfer control engine 606 determines (at the decision step 704) that the source tracking is to be performed for the requested file 502, the routine 700 may instead proceed to a step 710, at which the file transfer control engine 606 may send a request to the file modification engine 608 for a version of the requested file that has been modified for source tracking purposes. An example routine 800 that may be performed by the file modification engine 608 in response to such a request is described below in connection with FIG. 8.

As shown in FIG. 7, the routine 700 may wait at a decision step 712, until the file transfer control engine 606 determines that a modified version of the requested file 502 has been received from the file modification engine 608.

At a step 714, after a modified version of the requested file 502 has been received from the file modification engine 608, the file transfer control engine 606 may send the modified version of the file 502 to the requesting client device 202.

Figure 8:
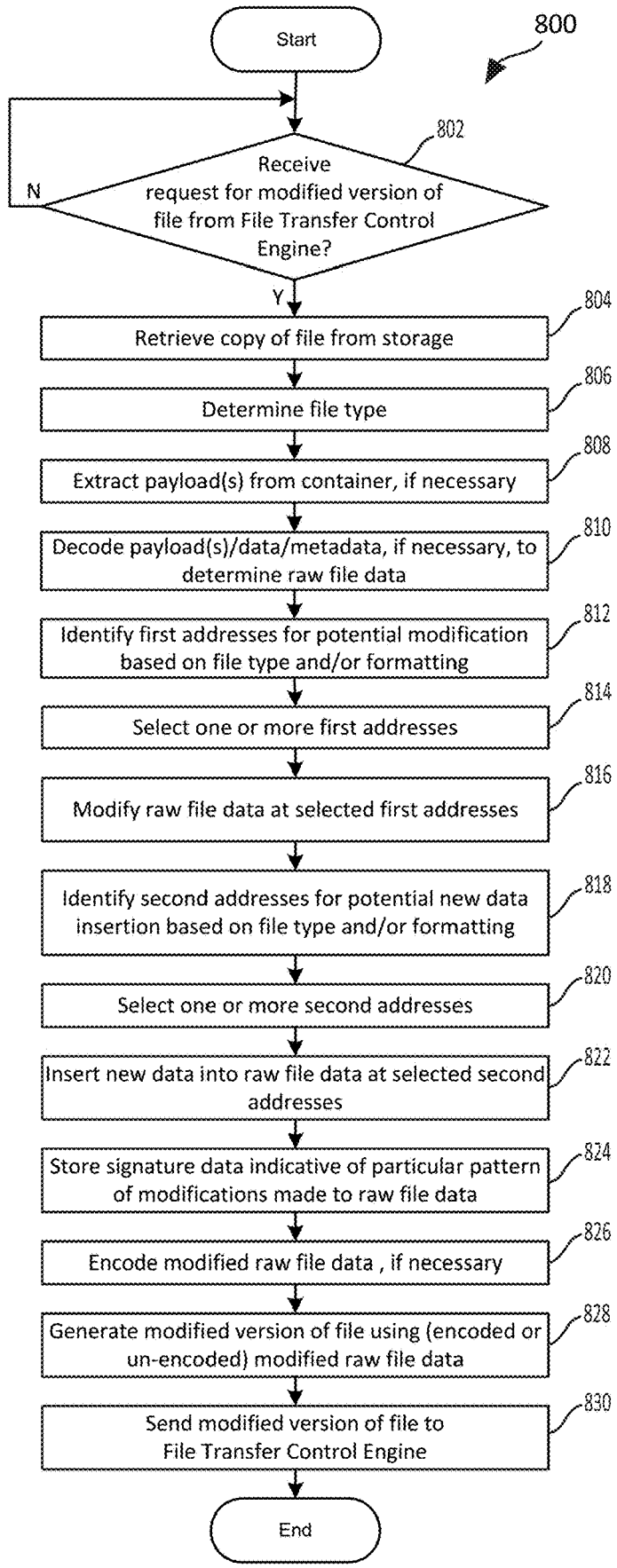
FIG. 8 shows an example routine that may be performed by the file modification engine shown in FIG. 6.

FIG. 8 is a flowchart showing an example routine 800 that may be performed by the file modification engine 608 shown in FIG. 6. As noted above, in some implementations, the file modification engine 608 may receive and respond to requests from the file transfer control engine 606 for modified versions of particular files (e.g., files identified by download tokens received from client devices 202).

As shown in FIG. 8, the routine 800 may begin at a decision step 802, at which the file modification engine 608 may determine (as previously explained in connection with FIG. 7) whether it has received a request from the file transfer control engine 606 (or elsewhere) for a modified version of a particular file 502. In some implementations, the request received from the file transfer control engine 606 may include a download token or other unique identifier of the file 502 that is to be retrieved from storage and modified in accordance with a particular pattern of modifications, as described below.

When, at the decision step 802, the file modification engine 608 determines that a request for a modified version of a file 502 has been received, the routine 800 may proceed to a step 804, at which the file modification engine 608 may retrieve a copy of the specified file 502 from the storage medium(s) 104, 512. The process used to retrieve such a copy from the storage medium(s) 104, 512 may, in some implementations, be the same as that used by the file transfer control engine 606 and/or the storage control server(s) 204b, as described above, to retrieve files from the storage medium(s) 104, 512.

At a step 806 of the routine 800, the file modification engine 608 may determine a file type of the retrieved file

502. Such a determination may be made, for example, based on metadata included in a header of the file 502 and/or an extension appended to the end of the file's name, such as "mp4," "jpeg," "bmp," "docx," "xlsx," "pdf," etc. As explained in detail below, in some implementations, the determined file type may subsequently be used (e.g., at steps 808, 810, 812, 818, 826 and/or 828) to perform tasks such as extracting payload data from the file (per the step 808), decoding (e.g., decompressing) encoded data and/or metadata to yield un-encoded data and/or metadata (per the step 810), identifying un-encoded data and/or metadata in the file and can be modified and/or supplemented without significantly impacting the substantive content of the file (per the steps 812 and/or 818), re-encoding un-encoded data and/or metadata that that has been modified or supplemented, if necessary (per the step 826), and repackaging (encoded or un-encoded) modified data and/or metadata into a file container, if necessary (per the step 828). As used herein, the term "raw file data" refers to any such un-encoded (e.g., uncompressed or decompressed) data and/or metadata in a file.

At a step 808 of the routine 800, the file modification engine 608 may, if necessary, extract one or more payloads from a container for the file 502 so as to give the file modification engine 608 access to that data for further processing. Further, at a step 810 of the routine 800, the file modification engine 608 may, if necessary, decode (e.g., decompress) the extracted payload(s), if any, as well as any other data and/or metadata within the file 502 that happens to be encoded. It should be appreciated that the steps 808 and/or 810 may not need to be performed for all types of files 502 in order for the file modification engine 608 to be able to access the raw file data. For example, some files 502 may not have payload(s) included within a container, or may not include any data and/or metadata that has been encoded (e.g., compressed). As noted previously, in some implementations, the file modification engine 608 may determine whether and/or how to perform the steps 808 and/or 810 based at least in part on the file type determined at the step 806.

Once the file modification engine 608 has access to the raw file data (by performing the steps 806, 808 and/or 810, or otherwise), the routine 800 may proceed to a step 812, at which the file modification engine 608 may identify first addresses of the raw file data at which one or more bits can potentially be modified without altering the substantive content of the file 502 in a way that could be readily perceived by a user. Such first addresses may be identified in any of numerous ways and based on any of a number of criteria. In some implementations, the manner in which first addresses are selected at the step 812 may depend, in whole or in part, on the file type determined at the step 806. In some implementations, the technique used to identify the first addresses may additionally or alternatively depend upon the particular way in which the raw file data is formatted, based on metadata included in the file 502 or otherwise. Although a handful of possible techniques for identifying the first addresses will now be described, it should be appreciated that such examples are merely illustrative of the myriad of techniques that could be employed either with the same types of files or with any of a number of different file types.

As a very simple example, the file 502 being processed may be a bitmap image file (which may also be referred to as a "BMP file format"). Such a file format has a large amount of metadata that precedes a "pixel array," i.e., the bytes of data that represent the actual values of the individual pixels in an image, and may also include metadata the follows the bytes representing the pixel array. Each "byte" of data in the file may include eight bits, and may be represented by a two digit hexadecimal ("hex") number. The pixel array and the metadata may be represented by respective, sequentially listed bytes, with the "address" (also called the "offset") of each such byte corresponding to that byte's position in the listed sequence. One of the bytes of the metadata (located at the hex address "OA") may specify the address (or offset) at which the bitmap image data, i.e., the bytes representing the pixel array, begins. Other bytes of metadata (located at the hex addresses "12," "14" and "18") may specify the width and height of the pixel array, as well as the number of bits that are used to represent each pixel value.

Some of the bytes of metadata and, in many circumstances, some of the bytes of the pixel array, do not impact the display of the image in any way, or may have only a minute, imperceptible impact on the manner in which the image represented by the bitmap image data is displayed. Accordingly, in some implementations, when the file type identified at the step 806 is a bitmap image file, such as that described above, the identification of first addresses at the step 812 of the routine 800 may, for example, involve identifying addresses (or offsets) of one or more bytes of metadata that have either no impact or only a minor impact on the way that an image is displayed. In some implementations, the step 812 may additionally or alternatively involve identifying one or more bytes of the pixel array that do not impact the display of an image in any way (e.g., padding bytes that are added to make each row in the pixel array a multiple of four bytes in size), or that have only a minor impact on the presentation of the image, e.g., bytes representing the least significant bits of respective pixels or bytes representing pixels at or near the periphery of an image. Further, recognizing that changing only a handful of bytes in a pixel array, no matter what those bytes represent, is unlikely to have a significant impact on a user's perception of a displayed image, in some implementations, the addresses of all, or nearly all, of the bytes of the pixel array may be identified as first addresses at the step 812.

Similar techniques may likewise be used at the step 812 to identify first addresses for other types of files. For example, for video files, the first addresses identified at the step 812 may include addresses of bytes (or other addressable data units) representing individual pixels in respective frames and/or addresses of unused (e.g., padding bytes) or insignificant data or metadata bytes. For audio files, the first addresses identified at the step 812 may, for example, include addresses of bytes (or other addressable data units) representing respective audio samples and/or insignificant metadata.

Some file types may be formatted to include a group of sub-files or directories, with at least some such sub-files/ directories including data and/or metadata that may modified without changing the substantive content represented by the file 502. For example, "docx" files generally include two directories defined by the paths "/word" and "/docProps," respectively. In such files, the "word" directory defines textual (or other) content and formatting, whereas the "docProps" directory defines metadata. There may be a number of instances in which data and/or metadata in such sub-files and/or directories can be modified without corrupting the substantive content of the file 502. For example, in the "docProps" directory, there is a "file created" timestamp that may be modified without changing the substantive content of the file 502. Accordingly, in some implementations, the first addresses determined at the step 812 may additionally or alternatively include addresses at which such insignificant data and/or metadata is stored.

At a step 814 of the routine 800, the file modification engine 608 may select one or more of the first addresses identified at the step 812 and, at a step 816, the file modification engine 608 may modify the data at the first addresses selected at the step 814. In some implementations, the number of first addresses selected at the step 814 may be variable and/or may be randomly selected from a range of possible numbers (e.g., between four and twenty first addresses) for the respective file copies the file modification engine 608 processes. In some implementations, the particular addresses that are selected from among the first addresses may additionally or alternatively be variable and/or randomly determined, from among the first addresses determined at the step 812, for the respective file copies that are processed by the file modification engine 608.

The modifications made at the step 816 may be effected in any of a number of ways. In some implementations, for example, the respective bytes (or other addressable data units) at the selected addresses may be replaced entirely with variable and/or randomly selected sequences of bit values. In some implementations, for example, the bit values of the respective bytes (or other addressable data units) may first be read and may then be rewritten so as to replace only one or more of the least significant bit values, or some other portion, of the bytes (or other addressable data units) with one or more variable and/or randomly selected bits. In other implementations, some or all of the bit values of respective bytes (or other addressable data units) may instead be inverted from "1" to "0," or vice versa, such as by applying a bitmask in a particular way, e.g., using an XOR operation. For example, if the bitmask "00001111" is XOR'ed with the bit string "11010101," the final four bits in the string may be inverted to yield the bit string "11011010." In some implementations, the bit values of the respective bit masks may be variable and/or randomly determined. Further, in some implementations, two or more such techniques may be employed in combination. For example, in some implementations, some bytes (or other addressable data units) may be rewritten, in whole or in part, to include a particular string of one or more bit values and other bytes (or other addressable data units) may be rewritten, in whole or in part, to include one or more bit values that are inverted from their original values. In any event, the particular changes that are made to respective bytes (or other addressable data units) as well as the addresses of those bytes (or other addressable data units) may be recorded, so as to enable the storage (at the step 824) of signature data indicative of the changes made to the raw file data, e.g., in the storage medium(s) 104, 512, as described below. As explained below, in implementations in which one or more new bytes (or other addressable data units) are additionally inserted (e.g., at a step 822) into the raw file data at particular addresses, the initially recorded first addresses at which bytes (or other addressable data units) are modified per the step 816 may need to be adjusted (e.g., incremented) to account for the addition of such new bytes (or other addressable data units) at those locations, prior to being stored, e.g., in the storage medium(s) 104, 512, as part of the signature data, per the step 824. Further, although not shown in FIG. 8, it should be appreciated that, in some implementations, one or more unimportant bytes (or other addressable data units) of data and/or metadata may additionally or alternatively be deleted from the raw file data. In such a case, the initially recorded first addresses at which bytes (or other addressable data units) are modified per the step 816 may likewise need to be adjusted (e.g., decremented) to account for the removal of such bytes (or other addressable data units) from those locations, prior to being stored, e.g., in the storage medium(s) 104, 512, as part of the signature data, per the step 824.

At a step 818 of the routine 800, the file modification engine 608 may identify second addresses within that raw file data that are available to be selected as locations at which new bytes (or other addressable data units) of data can be inserted into the raw file data without altering the substantive content of the file 502 in a way that could be readily perceived by a user. Like the first addresses identified at the step 812, the second addresses may be identified in any of numerous ways and based on any of a number of criteria. And also like the first addresses, in some implementations, the manner in which the second addresses are identified at the step 818 may depend, in whole or in part, on the type of the file 502 that is being processed (e.g., as determined at the step 806). In some implementations, the technique used to identify the second addresses may additionally or alternatively depend upon the particular way in which the raw file data is formatted, based on metadata included in the file 502 or otherwise. Although a handful of possible techniques for identifying the second addresses will now be described, it should be appreciated that such examples are merely illustrative of the myriad of techniques that could be employed either with the same types of files or with any of a number of different file types.

For a bitmap image file, such as that discussed above, in some implementations, the second addresses may correspond to addresses of bytes representing respective pixels in the pixel array. For example, one or more new bytes could be inserted at any such address, so as to effectively shift the pixels in the image by a corresponding number of bytes. In some implementations, byte(s) for a corresponding number of pixels in the same row as the added byte(s) could also be deleted, so that only a single row of pixels in the image is shifted slightly. A similar process could likewise be employed with respect to columns of pixels. In some implementations, the addresses of bytes corresponding to the initial pixels in the respective rows or columns could additionally or alternatively be identified as second addresses, such that new bytes representing entire rows or columns of pixels could be inserted at such addresses. In such an implementation, bytes representing one or more columns and/or rows of pixels could also be deleted (e.g., from the end of the bitmap image data) so that the size of the pixel array does not change. In some implementations, the bytes for at least a portion of the newly inserted row or column may be copied from a prior or subsequent row or column, so as to minimize the potential impact on the image that is displayed based on the file.

Further, in some implementations, the metadata of a bitmap image file may be altered so as to allow the insertion of additional unused bytes of data in the pixel array, such as by increasing the height and/or width of the pixel array and/or by increasing the number of bits representing respective pixels. In such a case, the addresses of the additional unused byte(s) in the pixel array that could potentially be created by modifying such metadata may additionally or alternatively be identified as second addresses at the step 818. When such a second address is selected (at a step 820—described below), the metadata of the bitmap image file may then be adjusted so as to allow the insertion of such new byte(s), e.g., as new padding bytes, new bytes representing new rows or columns of pixels, new bytes representing additional (unused) pixel bit values, etc.

Similar techniques may likewise be used at the step 818 to identify second addresses for other types of files. For example, for video files, the second addresses identified at the step 818 may include addresses of bytes (or other addressable data units) representing individual pixels in respective frames at which one or more new bytes may be inserted (so as to cause a pixel shift) or addresses of the initial bytes in rows and/or columns of the pixels in such frame at which bytes representing an entire row or column of pixels may be inserted (so as to cause a row/column shift). Metadata may additionally or alternatively be altered in such files so as to allow the insertion of additional unused bytes at various locations, using a technique similar to that described above for bitmap image files. For audio files, the second addresses identified at the step 818 may, for example, include addresses of bytes (or other addressable data units) representing respective audio samples.

For text files, such as "docx" files, the second data addresses identified at the step 818 may include addresses at which new unused or insignificant data or metadata could potentially be inserted, e.g., in the "docProps" directory and/or the "word" directory.

At the step 820, the file modification engine 608 may select one or more of the second addresses identified at the step 818 and, at a step 822, may insert new bytes (or other addressable data units) at the second addresses selected at the step 820. In some implementations, the number of second addresses selected at the step 820 may be variable and/or may be randomly selected from a range of possible numbers (e.g., between four and twenty second addresses) for the respective file copies the file modification engine 608 processes. In some implementations, the particular addresses that are selected from among the second addresses may also be variable and/or randomly determined, from among the second addresses identified at the step 818, for the respective file copies that are processed by the file modification engine 608. It should be appreciated that following respective insertions of bytes (or other addressable data units) at the step 822, the file modification engine may need to adjust the values of the remaining second addresses, as well as the recorded values of the addresses of bytes (or other addressable data units) that were modified at the step 816, as described above, to account for the resultant shifting of bytes (or other addressable data units) within the raw file data.

The data insertions effected at the step 822 may be accomplished in any of a number of ways. In some implementations, for example, variable and/or randomly selected sequences of bit values may be inserted, as new bytes (or other addressable data units), at the selected second addresses. In some implementations, less than all of the newly inserted bytes, or bits within such bytes, may include such a variable and/or randomly selected sequence of bit values. For example, for files in which metadata is altered to allow the insertion of significant amounts of additional unused data, or entire pixel rows/columns or other large quantities of data are added to raw file data, the variable and/or randomly generated sequence of bit values can be included in just a subset of such newly inserted data. In any event, the variable and/or randomly selected sequences of bit values that are inserted as well as the addresses of the bytes (or other addressable data units) in which such bit values are included may be recorded, so as to enable the storage (at the step 824) of signature data indicative of the changes made to the raw file data, e.g., in the storage medium(s) 104, 512, as described below. As bytes (or other addressable data units) are inserted at the step 822, the file modification engine 608 may need to adjust the recorded addresses of bytes (or other addressable data units) that were previously inserted at the step 822, as well as the values of the remaining second addresses and/or the recorded addresses of bytes (or other addressable data units) that were previously modified at the step 816, as described above, to account for the resultant shifting of bytes (or other addressable data units) within the raw file data. Further it should be appreciated that the steps 816 and 822 need not be performed in the order illustrated. That is, in some implementations, data and/or metadata may be inserted at selected addresses (per the step 822) prior to data and/or metadata being modified at other addresses (per the step 816). Moreover, in some implementations, multiple data insertion actions (per the step 822) may be interleaved with multiple data modifications (per the step 816). Also, as mentioned above, in some implementations, one or more unimportant bytes of data and/or metadata may additionally or alternatively be deleted from the raw file data. In any event, as noted previously, it may be necessary to adjust (e.g., increment or decrement) previously recorded addresses to account for the resultant shifting of bytes (or other addressable data units) within the raw file data in such circumstances.

Figure 9:
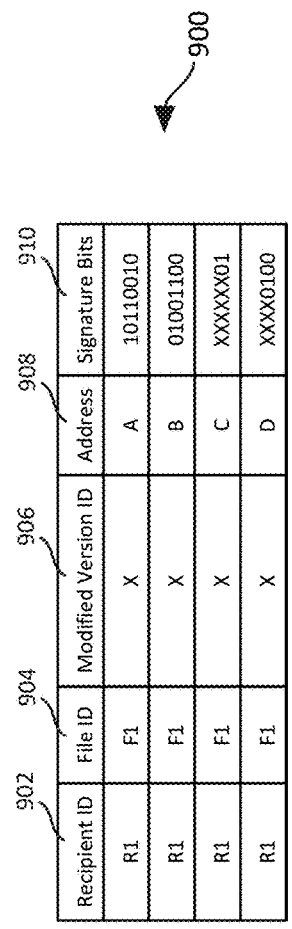
FIG. 9 shows an example table including signature data that may be determined by the file modification engine for modified versions of files.

At a step 824 of the routine 800, the file modification engine 608 may store signature data (e.g., in the storage medium(s) 104, 512) that is indicative of the pattern of modifications that were made to the raw file data at the step 816 and/or step 822, taking into account any address shifts that resulted from respective data/metadata insertions at the step 822 and/or any data/metadata deletions. FIG. 9 shows an example table 900 that may be used store such signature data. As indicated in the table 900, in some implementations, the signature data that is stored may, for a given modified version of a file (e.g., as indicated by the "modified version ID" entries 906), include addresses within the raw file data at which changes were made pursuant to the step 816 and/or the step 822 (e.g., as indicated by the "address" entries 908). The information in the "address" entries 908 may be different for different types of files. For example, for bitmap image files, such as those described above, the values in the "address" entries 908 may simply be the "offset" of particular bytes in the raw file data. For video files, the values in the "address" entries 908 may, for example, indicate both a frame and a relative address within the data/metadata for that frame. For audio files, the values in the "address" entries 908 may, for example, indicate both an audio channel and a relative address within the data/metadata for that audio channel. For other files, e.g., "docx" files, the values in the "address" entries 908 may indicate both a directory and a relative address within that directory. Many other formats and configurations of the values in the "address" entries 908 are possible and contemplated for the foregoing file types as well as for other types of files.

As discussed above, in some implementations, the file modification engine 608 may cause one or more bits of signature data to be included at selected addresses in the raw file data. As indicated in the table 900, the values of those bits of signature data may be stored within "signature bit" entries 910 corresponding to the addresses at which they are included (as indicated by the "address" entries 908). For instance, in the illustrated example, the "signature bits" entry 908 for the address "A" includes the bit sequence "1011001." As described above, in some implementations, the file modification engine 608 may cause fewer than all of the bits at a particular address (e.g., just the least significant bits) to include signature data. For example, for address "C" in the table 900, only the two least significant bits represent signature data, i.e., "01." The "X" symbols in the "signature bits" entries 910 represent "don't care" values. Altering only the least significant bits at particular addresses may make decrease the likelihood that such changes can be detected and/or perceived by a user.

As discussed below, by determining whether one or more of the particular bit strings represented in the signature data (indicated in the "signature bits" entries 910 in the table 900) are present at the same addresses of another copy of the file, the file evaluation engine 610 may determine whether that other copy of the file was derived from the modified version of the file indicated in the table 900 (e.g., by the "modified version ID" entries 906). Further, as also explained below, because the respective modified versions (e.g., as indicated by the "modified version ID" entries 906) of a particular file (e.g., as indicated by the "file ID" entries 904) that are distributed by a file sharing system may be correlated with the users who initially received those versions (e.g., via the "recipient ID" entries 902 in the table 900), the identity of the individual responsible for permitting or enabling the unauthorized redistribution of the copy of the file 502 may be readily determined.

In some implementations, at the step 824 of the routine 800 (shown in FIG. 8), the signature data may additionally or alternatively be stored using a blockchain implementation. In particular, the signature data may be presented to a blockchain ledger using a unique identifier of the recipient of the modified version of the file. The ledger may, for example, be appended with the signature data for the new individual who has been sent the modified version of the file along with the timestamp. By using a blockchain process to enter the records into the ledger, the records may be stored in a consistent manner and in the correct order of transactions. Each transfer of a modified version of a file to a client device 202 may be recorded as a transaction in the blockchain ledger. When a copy of the file is found that is suspected to be a "leaked" version, the corresponding blockchain ledger may be searched beginning with the first recorded transaction in the ledger for signature data that is consistent with raw file data in the suspect copy. The recipient whose signature data matches that of the compromised/leaked file may be identified as the source of the leak. By using a blockchain process, since there is no centralized, single source for maintaining the ledger, the stored signature data may be less prone to attacks, such as attempts to modify or delete the stored information. Such ledgers are also immutable, making it extremely difficult for leakers of data to assert that they have been being falsely accused of leaking information.

At a step 826 of the routine 800 (shown in FIG. 8), the file modification engine 608 may, if necessary, encode the raw file data, as modified pursuant to the steps 816 and 822, into a suitable format. Such an encoding step may be performed, for example, when a corresponding decoding process was invoked at the step 810.

At a step 828 of the routine 800, the file modification engine 608 may generate the modified version of the file using the modified raw file data and/or an encoded version of that data that was produced at the step 826. In some implementations, the step 828 may include repackaging such data into a suitable file container, such as in circumstances in which one or more payloads were extracted from a container per the step 808, described above.

Finally, at a step 830 of the routine 800, the file modification engine 608 may send the modified version of the file (generated at the step 828) to the file transfer control engine 606, which may then send (per the step 714 of the routine 700—shown in FIG. 7) the modified version of the file to the client device 202 that requested a copy of the file 502 from the file transfer control engine 606) (per the decision step 702 of the routine 700), as discussed above.

Figure 10:
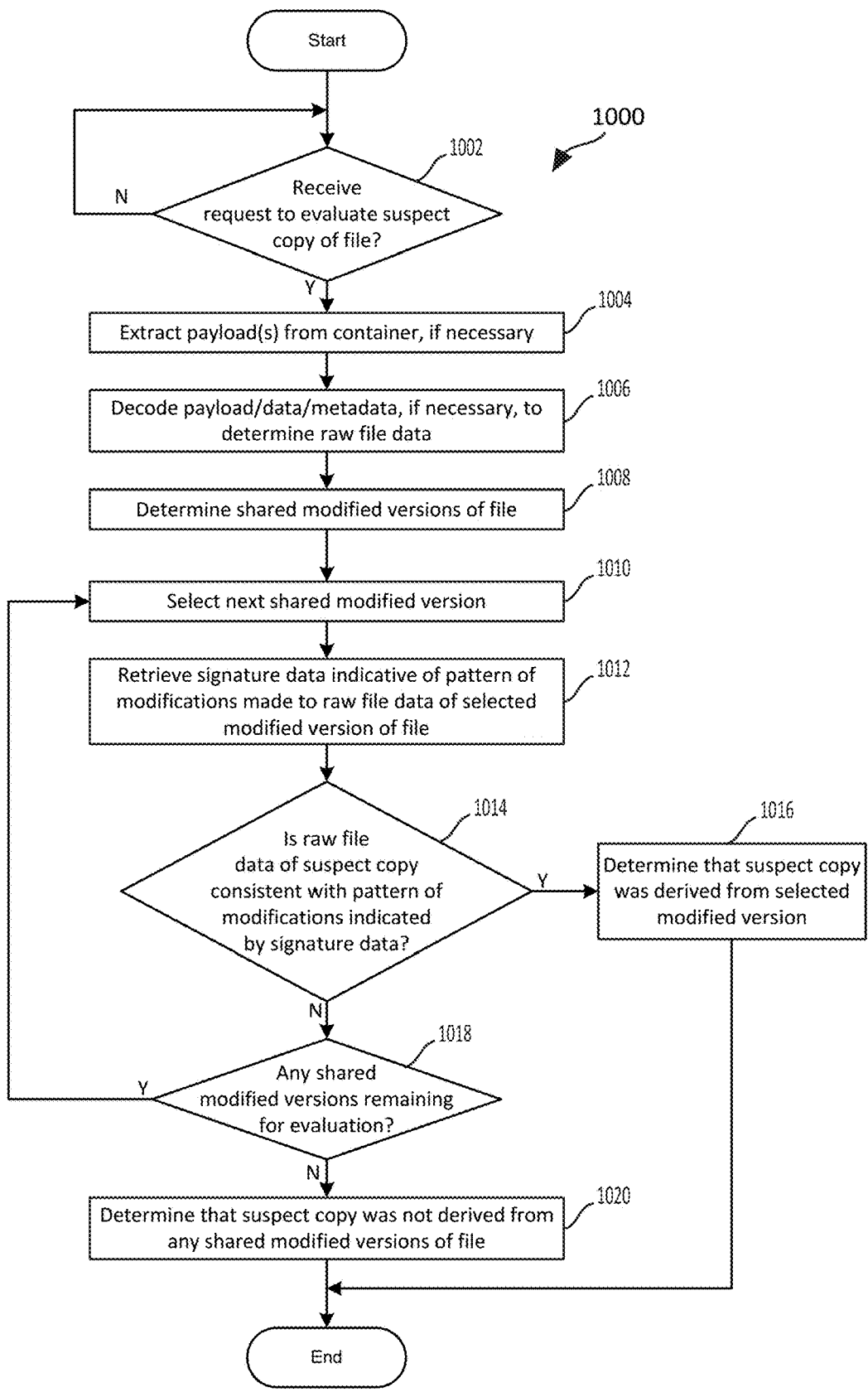
FIG. 10 shows an example routine that may be performed by the file evaluation engine shown in FIG. 6.

FIG. 10 is a flowchart showing an example routine 1000 that may be executed by the file evaluation engine 610 shown in FIG. 6. As shown, the routine 1000 may begin at a step 1002, at which the file evaluation engine 610 may receive a request to evaluate a copy of a file 502 that is suspected to have been redistributed without authorization. The "suspect" copy received at the step 1002 may be a file that someone has actually determined was potentially leaked or may simply be a copy of a file, e.g., as a part of a large batch of accumulated file copies, that is to be evaluated without having been specifically identified as "suspicious."

The steps 1004 and 1006 of the routine 1000 performed by the file evaluation engine 610 are analogous to the step 808 and 810 of the routine 800 (shown in FIG. 8) performed by the file modification engine 608. In particular, at the step 1004, the file evaluation engine 610 may, if necessary, extract one or more payloads from a container for the file and, at the step 1006, the file evaluation engine 610 may, if necessary, decode (e.g., decompress) the extracted payload(s), if any, as well as any other data and/or metadata within the file that happens to be encoded. As was the case with the steps 808 and 810, it should be appreciated that the steps 1004 and/or 1006 may not need to be performed for all types of files in order for the file evaluation engine 610 to be able to access to the raw file data in the suspect file. For example, some files may not have payload(s) included within a container, or may not include any data and/or metadata that has been encoded (e.g., compressed). Although not illustrated in FIG. 10, it should be appreciated that, in some implementations, the file evaluation engine 610 may determine whether and/or how to perform the steps 1004 and/or 1006 based at least in part on a determined file type of the suspect file. Such a determination may be made, for example, based on metadata contained in a header of the file and/or an extension appended to the end of the file's name, such as "mp4," "jpeg," "bmp," "docx," "xlsx," "pdf," etc.

Once the file evaluation engine 610 has access to the raw file data (by performing the steps 1004, 1006, or otherwise), the routine 1000 may proceed to a step 1008, at which the file evaluation engine 610 may determine one or more modified versions of the same file that were previously generated and distributed to client devices 202. For example, in some implementations, the table 900 may be consulted to identify modified version IDs (per the "modified version ID" entries 906) with the same file ID (per the "file ID" entries 904) as the suspect file. The file ID of the suspect file may be determined, for example, based on metadata in the file, the title of the file, of based on a determination made by a user. For example, a user may believe that the suspect file may be a leaked copy of a particular movie and may thus request that the suspect copy of the file be compared against stored signature data for distributed copies of that same movie.

Per the step 1010 and the decision step 1018 of the routine 1000, the file evaluation engine 610 may cycle through the shared modified versions of the file (as determined at the step 1008), and may determine (at a decision step 1014— described below) whether the raw file data of the suspect copy is consistent with the modifications indicated by the stored signature data (retrieved at a step 1012) for the respective modified versions. Although FIG. 10 illustrates the modified versions being evaluated one at a time, it should be appreciated that they may instead be evaluated, either in whole or in part, in parallel.

At the step 1012, the file evaluation engine 610 may retrieve the stored signature data for a given modified version, for example, by accessing the table 900 (shown in FIG. 9) to determine the signature data (e.g., the addresses indicated in the "address" entries 908 and the corresponding signature bits indicated in "signature bits" entries 910) for that modified version (as indicated in the "modified version ID" entries 906).

At the decision step 1014, the file evaluation engine 610 may evaluate the raw file data of the suspect copy to determine whether it is consistent, in whole or in part, with the pattern of modifications that are indicated by the retrieved signature data. The evaluation performed at the decision step 1014 may be performed in any of a number of ways, and may depend on the nature of the signature data that is stored for a given modified version of the file. In some implementations, the file evaluation engine may perform the decision step 1014 by comparing the data/metadata at the indicated addresses within the raw file data of the suspect copy (e.g., as indicated by the "address" entries 908 in the table 900) with the values of the corresponding "signature bits" entries 910 in the table 900. When one or more, or perhaps more than a threshold number, of the indicated addresses include values that match the indicated "signature bits" entries 910, the routine 1000 may proceed to a step 1016, at which the file evaluation engine 610 may determine that the suspect copy was derived from the modified version whose signature data is being considered. When, on the other hand, none of the "signature bits" entries match the raw file data at the indicated addresses, or perhaps when less than a threshold number of such matches are found, the routine 1000 may instead proceed to the decision step 1018, at which the file evaluation engine 610 may determine whether there are any modified versions of the file under consideration (i.e., as determined at the step 1008) remaining to be evaluated. When, at the decision step, the file evaluation engine 610 determines that there are additional modified versions of the file to be evaluated, the routine 1000 may return to the step 1010, at which the next shared modified version of the file (as determined at the step 1008) may be considered. When, on the other hand, the file evaluation engine 610 determines that there are not any additional modified versions of the file to be evaluated, the routine 1000 may instead proceed to a step 1020, at which the file evaluation engine 610 may determine that the suspect copy was not derived from any of the modified versions of the file that had been previously shared, or at least that it was not possible, based on the stored signature data, that the suspect copy has been so derived.

G. Example Implementations of Methods, Systems, and Computer-Readable Media in Accordance with the Present Disclosure The following paragraphs (M1) through (M16) describe examples of methods that may be implemented in accordance with the present disclosure.

(M1) A method may involve determining, by a computing system, different patterns of modifications that are to be made to first data of a file to generate respective modified versions of the file, the different patterns of modifications enabling identification of other files derived from the respective modified versions of the file, the different patterns of modifications including a first pattern of modifications; generating, by the computing system, a first modified version of the file at least in part by modifying the first data based on the first pattern of modifications; sending, by the computing system, the first modified version of the file to a first client device; and storing, by the computing system, first signature data indicative the first pattern of modifications so as to enable identification of other files derived from the first modified version of the file.

(M2) A method may be performed as described in paragraph (M1), wherein the different patterns of modifications may further comprise a second pattern of modifications that is different than the first pattern of modifications; and wherein determining the different patterns of modifications may further comprise determining the first pattern of modifications at a first time following receipt of a first request for a copy of the file from the first client device, and determining the second pattern of modifications at a second time following receipt of a second request for a copy of the file from a second client device.

(M3) A method may be performed as described in paragraph (M2), and may further involve generating, by the computing system, a second modified version of the file at least in part by modifying the first data based on the second pattern of modifications; sending, by the computing system, the second modified version of the file to the second client device; and storing, by the computing system, second signature data indicative the second pattern of modifications.

(M4) A method may be performed as described in any of paragraphs (M1) through (M3), and may further involve determining a user of the first client device to which the first modified version of the file is sent; and generating the first signature data such that the first signature data is further indicative of the user.

(M5) A method may be performed as described in any of paragraphs (M1) through (M4), wherein modifying the first data based on the first pattern of modifications may further comprise changing a value of at least a first bit in the first data; and wherein the first signature data may enable identification of the first bit within other files that are derived from the first modified version of the file.

(M6) A method may be performed as described in any of paragraphs (M1) through (M5), wherein modifying the first data based on the first pattern of modifications may further comprise inserting at least a second bit into the first data.

(M7) A method may be performed as described in paragraph (M6), wherein the first signature data further enables identification of the second bit within other files that are derived from the first modified version of the file.

(M8) A method may be performed as described in any of paragraphs (M1) through (M7), wherein generating the first modified version of the file may further comprise extracting a payload from a container of the file; decoding the payload to determine the first data; modifying the first data based on the first pattern of modifications to generate modified first data; encoding the modified first data to generate a modified payload; and including the modified payload in the first modified version of the file.

(M9) A method may be performed as described in any of paragraphs (M1) through (M7), and may further involve determining that the file is of a first file type; determining, based at least in part on the file being of the first file type, addresses of the first data that can potentially be used to modify the first data based upon the first pattern of modifications; and determining the first pattern of modifications at least in part by selecting a subset of the addresses.

(M10) A method may be performed as described in paragraph (M9), wherein determining the first pattern of modifications may further comprise determining that a value of at least one bit of an existing addressable unit of data at a first address of the subset of addresses is to be changed.

(M11) A method may be performed as described in paragraph (M9) or paragraph (M10), wherein determining the first pattern of modifications may further comprise determining that at least one new addressable unit of data is to be inserted into the first data at a second address of the subset of addresses.

(M12) A method may be performed as described in any of paragraphs (M1) through (M11), and may further involve identifying a copy of the file; determining, based at least in part on the first signature data, that second data of the copy of the file is at least partially consistent with the first pattern of modifications made to the first data; and determining, based at least in part on the second data being at least partially consistent with the first pattern of modifications, that the copy of the file was derived from the first modified version of the file.

(M13) A method may be performed as described in paragraph (M12), wherein determining that the second data is at least partially consistent with the first pattern of modifications may further comprise determining that the first signature data indicates that third data of the first modified version of the file was modified to include at least a first data value at a first address; and determining that the second data includes the first data value at the first address.

(M14) A method may involve identifying, by a computing system, a copy of a file; accessing, by the computing system, stored signature data entries for respective modified versions of the file, wherein the stored signature data entries are indicative of different patterns of modifications made to first data of the file to generate the respective modified versions of the file, the different patterns of modifications include a first pattern of modifications made to the first data of the file to generate a first modified version of the file, and the stored signature data entries include a first signature data entry for the first modified version of the file; determining, by the computing system, that second data of the copy of the file is at least partially consistent with the first pattern of modifications indicated by the first signature data entry; and determining, by the computing system and based at least in part on the second data being at least partially consistent with the first pattern of modifications, that the copy of the file was derived from the first modified version of the file.

(M15) A method may be performed as described in paragraph (M14), wherein determining that the second data is at least partially consistent with the first pattern of modifications may further comprise determining that the first signature data entry indicates that third data of the first modified version of the file was modified to include at least a first data value at a first address; and determining that the second data includes the first data value at the first address.

(M16) A method may be performed as described in paragraph (M14) or (M15), and may further involve extracting a payload from a container of the copy of the file; and decoding the payload to determine the second data.

The following paragraphs (S1) through (S16) describe examples of systems and devices that may be implemented in accordance with the present disclosure.

(S1) A computing system may comprise at least one processor and at least one computer-readable medium encoded with instructions which, when executed by the at least one processor, cause the computing system to determine different patterns of modifications that are to be made to first data of a file to generate respective modified versions of the file, the different patterns of modifications enabling identification of other files derived from the respective modified versions of the file, the different patterns of modifications including a first pattern of modifications, to generate a first modified version of the file at least in part by modifying the first data based on the first pattern of modifications, to send the first modified version of the file to a first client device, and to store first signature data indicative of the first pattern of modifications so as to enable identification of other files derived from the first modified version of the file.

(S2) A computing system may be configured as described in paragraph (S1), wherein the different patterns of modifications may further comprise a second pattern of modifications that is different than the first pattern of modifications; and wherein the at least one computer-readable medium may be encoded with additional instruction which, when executed by the at least one processor, further cause the computing system to determine the different patterns of modifications at least in part by determining the first pattern of modifications at a first time following receipt of a first request for a copy of the file from the first client device, and determining the second pattern of modifications at a second time following receipt of a second request for a copy of the file from a second client device.

(S3) A computing system may be configured as described in paragraph (S2), and the at least one computer-readable medium may be encoded with additional instruction which, when executed by the at least one processor, further cause the computing system to generate a second modified version of the file at least in part by modifying the first data based on the second pattern of modifications, to send the second modified version of the file to the second client device, and to store second signature data indicative the second pattern of modifications.

(S4) A computing system may be configured as described in any of paragraphs (S1) through (S3), and the at least one computer-readable medium may be encoded with additional instruction which, when executed by the at least one processor, further cause the computing system to determine a user of the first client device to which the first modified version of the file is sent, and to generate the first signature data such that the first signature data is further indicative of the user.

(S5) A computing system may be configured as described in any of paragraphs (S1) through (S4), wherein the at least one computer-readable medium may be encoded with additional instruction which, when executed by the at least one processor, further cause the computing system to modify the first data based on the first pattern of modifications at least in part by changing a value of at least a first bit in the first data; and wherein the first signature data may enable identification of the first bit within other files that are derived from the first modified version of the file.

(S6) A computing system may be configured as described in any of paragraphs (S1) through (S5), wherein the at least one computer-readable medium may be encoded with additional instruction which, when executed by the at least one processor, further cause the computing system to modify the first data based on the first pattern of modifications at least in part by inserting at least a second bit into the first data.

(S7) A computing system may be configured as described in paragraph (S6), wherein the first signature data further enables identification of the second bit within other files that are derived from the first modified version of the file.

(S8) A computing system may be configured as described in any of paragraphs (S1) through (S7), wherein the at least one computer-readable medium may be encoded with additional instruction which, when executed by the at least one processor, further cause the computing system to generate the first modified version of the file at least in part by extracting a payload from a container of the file; decoding the payload to determine the first data; modifying the first data based on the first pattern of modifications to generate modified first data; encoding the modified first data to generate a modified payload; and including the modified payload in the first modified version of the file.

(S9) A computing system may be configured as described in any of paragraphs (S1) through (S7), and the at least one computer-readable medium may be encoded with additional instruction which, when executed by the at least one processor, further cause the computing system to determine that the file is of a first file type, to determine, based at least in part on the file being of the first file type, addresses of the first data that can potentially be used to modify the first data based upon the first pattern of modifications, and to determine the first pattern of modifications at least in part by selecting a subset of the addresses.

(S10) A computing system may be configured as described in paragraph (S9), wherein the at least one computer-readable medium may be encoded with additional instruction which, when executed by the at least one processor, further cause the computing system to determine the first pattern of modifications at least in part by determining that a value of at least one bit of an existing addressable unit of data at a first address of the subset of addresses is to be changed.

(S11) A computing system may be configured as described in paragraph (S9) or paragraph (S10), wherein the at least one computer-readable medium may be encoded with additional instruction which, when executed by the at least one processor, further cause the computing system to determine the first pattern of modifications at least in part by determining that at least one new addressable unit of data is to be inserted into the first data at a second address of the subset of addresses.

(S12) A computing system may be configured as described in any of paragraphs (S1) through (S11), and the at least one computer-readable medium may be encoded with additional instruction which, when executed by the at least one processor, further cause the computing system to identify a copy of the file, to determine, based at least in part on the first signature data, that second data of the copy of the file is at least partially consistent with the first pattern of modifications made to the first data, and to determine, based at least in part on the second data being at least partially consistent with the first pattern of modifications, that the copy of the file was derived from the first modified version of the file.

(S13) A computing system may be configured as described in paragraph (S12), wherein the at least one computer-readable medium may be encoded with additional instruction which, when executed by the at least one processor, further cause the computing system to determine that the second data is at least partially consistent with the first pattern of modifications at least in part by determining that the first signature data indicates that third data of the first modified version of the file was modified to include at least a first data value at a first address; and determining that the second data includes the first data value at the first address.

(S14) A computing system may comprise at least one processor and at least one computer-readable medium encoded with instructions which, when executed by the at least one processor, cause the computing system to identify a copy of a file, to access stored signature data entries for respective modified versions of the file, wherein the stored signature data entries are indicative of different patterns of modifications made to first data of the file to generate the respective modified versions of the file, the different patterns of modifications include a first pattern of modifications made to the first data of the file to generate a first modified version of the file, and the stored signature data entries include a first signature data entry for the first modified version of the file, to determine that second data of the copy of the file is at least partially consistent with the first pattern of modifications indicated by the first signature data entry, and to determine, based at least in part on the second data being at least partially consistent with the first pattern of modifications, that the copy of the file was derived from the first modified version of the file.

(S15) A computing system may be configured as described in paragraph (S14), wherein the at least one computer-readable medium may be encoded with additional instruction which, when executed by the at least one processor, further cause the computing system to determine that the second data is at least partially consistent with the first pattern of modifications at least in part by determining that the first signature data entry indicates that third data of the first modified version of the file was modified to include at least a first data value at a first address; and determining that the second data includes the first data value at the first address.

(S16) A computing system may be configured as described in paragraph (S14) or (S15), and the at least one computer-readable medium may be encoded with additional instruction which, when executed by the at least one processor, further cause the computing system to extract a payload from a container of the copy of the file, and to decode the payload to determine the second data.

The following paragraphs (CRM1) through (CRM16) describe examples of computer-readable media that may be implemented in accordance with the present disclosure.

(CRM1) At least one non-transitory computer-readable medium may be encoded with instructions which, when executed by at least one processor of a computing system, cause the computing system to determine different patterns of modifications that are to be made to first data of a file to generate respective modified versions of the file, the different patterns of modifications enabling identification of other files derived from the respective modified versions of the file, the different patterns of modifications including a first pattern of modifications, to generate a first modified version of the file at least in part by modifying the first data based on the first pattern of modifications, to send the first modified version of the file to a first client device, and to store first signature data indicative the first pattern of modifications so as to enable identification of other files derived from the first modified version of the file.

(CRM2) At least one non-transitory computer-readable medium may be configured as described in paragraph (CRM1), wherein the different patterns of modifications may further comprise a second pattern of modifications that is different than the first pattern of modifications; and wherein the at least one computer-readable medium may be encoded with additional instruction which, when executed by the at least one processor, further cause the computing system to determine the different patterns of modifications at least in part by determining the first pattern of modifications at a first time following receipt of a first request for a copy of the file from the first client device, and determining the second pattern of modifications at a second time following receipt of a second request for a copy of the file from a second client device.

(CRM3) At least one non-transitory computer-readable medium may be configured as described in paragraph (CRM2), and may be encoded with additional instruction which, when executed by the at least one processor, further cause the computing system to generate a second modified version of the file at least in part by modifying the first data based on the second pattern of modifications, to send the second modified version of the file to the second client device, and to store second signature data indicative the second pattern of modifications.

(CRM4) At least one non-transitory computer-readable medium may be configured as described in any of paragraphs (CRM1) through (CRM3), and may be encoded with additional instruction which, when executed by the at least one processor, further cause the computing system to determine a user of the first client device to which the first modified version of the file is sent, and to generate the first signature data such that the first signature data is further indicative of the user.

(CRM5) At least one non-transitory computer-readable medium may be configured as described in any of paragraphs (CRM1) through (CRM4), wherein the at least one computer-readable medium may be encoded with additional instruction which, when executed by the at least one processor, further cause the computing system to modify the first data based on the first pattern of modifications at least in part by changing a value of at least a first bit in the first data; and wherein the first signature data may enable identification of the first bit within other files that are derived from the first modified version of the file.

(CRM6) At least one non-transitory computer-readable medium may be configured as described in any of paragraphs (CRM1) through (CRM5), and may be encoded with additional instruction which, when executed by the at least one processor, further cause the computing system to modify the first data based on the first pattern of modifications at least in part by inserting at least a second bit into the first data.

(CRM7) At least one non-transitory computer-readable medium may be configured as described in paragraph (CRM6), wherein the first signature data further enables identification of the second bit within other files that are derived from the first modified version of the file.

(CRM8) At least one non-transitory computer-readable medium may be configured as described in any of paragraphs (CRM1) through (CRM7), and may be encoded with additional instruction which, when executed by the at least one processor, further cause the computing system to generate the first modified version of the file at least in part by extracting a payload from a container of the file; decoding the payload to determine the first data; modifying the first data based on the first pattern of modifications to generate modified first data; encoding the modified first data to generate a modified payload; and including the modified payload in the first modified version of the file.

(CRM9) At least one non-transitory computer-readable medium may be configured as described in any of paragraphs (CRM1) through (CRM7), and may be encoded with additional instruction which, when executed by the at least one processor, further cause the computing system to determine that the file is of a first file type, to determine, based at least in part on the file being of the first file type, addresses of the first data that can potentially be used to modify the first data based upon the first pattern of modifications, and to determine the first pattern of modifications at least in part by selecting a subset of the addresses.

(CRM10) At least one non-transitory computer-readable medium may be configured as described in paragraph (CRM9), and may be encoded with additional instruction which, when executed by the at least one processor, further cause the computing system to determine the first pattern of modifications at least in part by determining that a value of at least one bit of an existing addressable unit of data at a first address of the subset of addresses is to be changed.

(CRM11) At least one non-transitory computer-readable medium may be configured as described in paragraph (CRM9) or paragraph (CRM10), and may be encoded with additional instruction which, when executed by the at least one processor, further cause the computing system to determine the first pattern of modifications at least in part by determining that at least one new addressable unit of data is to be inserted into the first data at a second address of the subset of addresses.

(CRM12) At least one non-transitory computer-readable medium may be configured as described in any of paragraphs (CRM1) through (CRM11), and may be encoded with additional instruction which, when executed by the at least one processor, further cause the computing system to identify a copy of the file, to determine, based at least in part on the first signature data, that second data of the copy of the file is at least partially consistent with the first pattern of modifications made to the first data, and to determine, based at least in part on the second data being at least partially consistent with the first pattern of modifications, that the copy of the file was derived from the first modified version of the file.

(CRM13) At least one non-transitory computer-readable medium may be configured as described in paragraph (CRM12), and may be encoded with additional instruction which, when executed by the at least one processor, further cause the computing system to determine that the second data is at least partially consistent with the first pattern of modifications at least in part by determining that the first signature data indicates that third data of the first modified version of the file was modified to include at least a first data value at a first address; and determining that the second data includes the first data value at the first address.

(CRM14) At least one non-transitory computer-readable medium may be encoded with instructions which, when executed by at least one processor of a computing system, cause the computing system to identify a copy of a file, to access stored signature data entries for respective modified versions of the file, wherein the stored signature data entries are indicative of different patterns of modifications made to first data of the file to generate the respective modified versions of the file, the different patterns of modifications include a first pattern of modifications made to the first data of the file to generate a first modified version of the file, and the stored signature data entries include a first signature data entry for the first modified version of the file, to determine that second data of the copy of the file is at least partially consistent with the first pattern of modifications indicated by the first signature data entry, and to determine, based at least in part on the second data being at least partially consistent with the first pattern of modifications, that the copy of the file was derived from the first modified version of the file.

(CRM15) At least one non-transitory computer-readable medium may be configured as described in paragraph (CRM14), and may be encoded with additional instruction which, when executed by the at least one processor, further cause the computing system to determine that the second data is at least partially consistent with the first pattern of modifications at least in part by determining that the first signature data entry indicates that third data of the first modified version of the file was modified to include at least a first data value at a first address; and determining that the second data includes the first data value at the first address.

(CRM16) At least one non-transitory computer-readable medium may be configured as described in paragraph (CRM14) or (CRM15), and may be encoded with additional instruction which, when executed by the at least one processor, further cause the computing system to extract a payload from a container of the copy of the file, and to decode the payload to determine the second data.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, at least a first address within an original copy of a file at which first data of the original copy of the file is to be modified in a first manner to generate a first modified version of the file;
   generating, by the computing system, the first modified version of the file at least in part by modifying the first data at the first address in the first manner;
   sending, by the computing system, the first modified version of the file to a first client device;
   storing, by the computing system, first signature data identifying one or more bit values stored at the first address in the first modified version of the file;
   determining, by the computing system, at least a second address within the original copy of the file at which second data of the original copy of the file is to be modified in a second manner to generate a second modified version of the file that is different than the first modified version of the file;
   generating, by the computing system, the second modified version of the file at least in part by modifying the second data at the second address in the second manner;
   sending, by the computing system, the second modified version of the file to a second client device; and
   storing, by the computing system, second signature data identifying one or more bit values stored at the second address in the second modified version of the file.

2. The method of claim 1, wherein:
   the first modified version of the file is generated in response to receipt of a first request for a copy of the file from the first client device, and
   the second modified version of the file is generated in response to receipt of a second request for a copy of the file from the second client device.

3. The method of claim 1, wherein:
   storing the first signature data comprises storing the first signature data as a first record of a blockchain ledger; and
   storing the second signature data comprises storing the second signature data as a second record of a blockchain ledger.

4. The method of claim 1, further comprising:
   determining a first user of the first client device to which the first modified version of the file is sent;
   generating the first signature data such that the first signature data is further indicative of the first user;
   determining a second user of the second client device to which the second modified version of the file is sent; and
   generating the second signature data such that the second signature data is further indicative of the second user.

5. The method of claim 1, wherein:
   modifying the first data at the first address further comprises changing a value of at least a first bit in the first data;
   configuring the first signature data to identify the changed value of the first bit in the first data;
   modifying the second data at the second address further comprises changing a value of at least a second bit in the second data; and
   configuring the second signature data to identify the changed value of the second bit in the second data.

6. The method of claim 5, further comprising:
   determining, by the computing system, at least a third address within the original copy of the file at which at least a third bit is to be inserted generate the first modified version of the file;
   generating, by the computing system, the first modified version of the file at least in part by inserting at least the third bit at the third address;
   configuring the first signature data to identify a value of the third bit inserted at the third address;
   determining, by the computing system, at least a fourth address within the original copy of the file at which at least a fourth bit is to be inserted generate the second modified version of the file;
   generating, by the computing system, the second modified version of the file at least in part by inserting at least the fourth bit at the fourth address; and
   configuring the second signature data to identify the fourth bit inserted at the fourth address.

7. The method of claim 1, further comprising:
identifying a copy of the file;
determining that second data at the first address of the copy of the file includes the one or more bit values identified by the first signature data; and
determining, based at least in part on the second data including the one or more bit values identified by the first signature data, that the copy of the file was derived from the first modified version of the file.

8. The method of claim 1, wherein:
modifying the first data at the first address further comprises inserting at least a first bit at the first address; and
configuring the first signature data to identify a value of the first bit inserted at the first address.

9. The method of claim 1, wherein generating the first modified version of the file further comprises:
extracting a payload from a container of the original copy of the file;
decoding the payload to determine the first data at the first address;
modifying the first data at the first address to generate modified first data;
encoding the modified first data to generate a first modified payload; and
including the first modified payload in the first modified version of the file.

10. The method of claim 9, further comprising:
determining that the file is of a first file type;
determining, based at least in part on the file being of the first file type, a plurality of addresses within the original copy of the file at which data can potentially be modified to generate the first modified version of the file; and
determining the first address at least in part by selecting the first address from among plurality of addresses.

11. The method of claim 10, wherein modifying the first data at the first address in the first manner further comprises:
changing a value of at least one bit of an existing addressable unit of data at the first address.

12. The method of claim 10, wherein modifying the first data at the first address in the first manner further comprises:
inserting at least one new addressable unit of data at the first address.

13. A method, comprising:
determining, by a computing system, at least a first address within an original copy of a file at which first data of the original copy of the file is to be modified in a first manner to generate a first modified version of the file;
generating, by the computing system, the first modified version of the file at least in part by modifying the first data at the first address in the first manner;
sending, by the computing system, the first modified version of the file to a client device;
storing, by the computing system, first signature data identifying one or more bit values stored at the first address in the first modified version of the file;
identifying, by the computing system, a copy of a file;
accessing, by the computing system, stored signature data entries for respective modified versions of the file, wherein the stored signature data entries include the first signature data for the first modified version of the file;
determining, by the computing system, that second data at the first address of the copy of the file includes the one or more bit values identified by the first signature data; and
determining, by the computing system and based at least in part on the second data including the one or more bit values identified by the first signature data, that the copy of the file was derived from the first modified version of the file.

14. The method of claim 13, further comprising:
extracting a payload from a container of the copy of the file; and
decoding the payload to determine the second data.

15. A computing system, comprising:
at least one processor; and
at least one non-transitory computer-readable medium encoded with instruction which, when executed by the at least one processor, cause the computing system to:
determine at least a first address within an original copy of a file at which first data of the original copy of the file is to be modified in a first manner to generate a first modified version of the file,
generate the first modified version of the file at least in part by modifying the first data at the first address in the first manner,
send the first modified version of the file to a first client device,
store first signature data identifying one or more bit values stored at the first address in the first modified version of the file,
determine at least a second address within the original copy of the file at which second data of the original copy of the file is to be modified in a second manner to generate a second modified version of the file that is different than the first modified version of the file,
generate the second modified version of the file at least in part by modifying the second data at the second address in the second manner,
send the second modified version of the file to a second client device, and
store second signature data identifying one or more bit values stored at the second address in the second modified version of the file.

16. The computing system of claim 15, wherein the at least one non-transitory computer-readable medium is further encoded with additional instructions which, when executed by the at least one processor, further cause the computing system to:
determine a first user of the first client device to which the first modified version of the file is sent;
generate the first signature data such that the first signature data is further indicative of the first user;
determine a second user of the second client device to which the second modified version of the file is sent; and
generate the second signature data such that the second signature data is further indicative of the second user.

17. The computing system of claim 15, wherein the at least one non-transitory computer-readable medium is further encoded with additional instructions which, when executed by the at least one processor, further cause the computing system to:
modify the first data at the first address at least in part by changing a value of at least a first bit in the first data;
configuring the first signature data to identify the changed value of the first bit in the first data;
modify the second data at the second address at least in part by changing a value of at least a second bit in the second data; and
configuring the second signature data to identify the changed value of the second bit in the second data.

18. The computing system of claim 15, wherein the at least one non-transitory computer-readable medium is further encoded with additional instructions which, when executed by the at least one processor, further cause the computing system to:
  modify the first data at the first address at least in part by inserting at least a first bit at the first address; and
  configure first signature data to identify a value of the first bit inserted at the first address.

19. The computing system of claim 15, wherein the at least one non-transitory computer-readable medium is further encoded with additional instructions which, when executed by the at least one processor, further cause the computing system to:
  generate the first modified version of the file in response to receipt of a first request for a copy of the file from the first client device; and
  generate the second modified version of the file in response to receipt of a second request for a copy of the file from the second client device.

20. The computing system of claim 15, wherein the at least one non-transitory computer-readable medium is further encoded with additional instructions which, when executed by the at least one processor, further cause the computing system to:
  identify a copy of the file;
  determine that second data at the first address of the copy of the file includes the one or more bit values identified by the first signature data; and
  determine, based at least in part on the second data including the one or more bit values identified by the first signature data, that the copy of the file was derived from the first modified version of the file.

* * * * *